US008069200B2

(12) United States Patent
Landers et al.

(10) Patent No.: US 8,069,200 B2
(45) Date of Patent: Nov. 29, 2011

(54) APPARATUS AND METHOD FOR IMPLEMENTING FLOATING POINT ADDITIVE AND SHIFT OPERATIONS

(75) Inventors: George Landers, Tigard, OR (US); Earle Jennings, Kensington, CA (US)

(73) Assignee: QSigma, Inc., Sunnyvale, CA (US)

( * ) Notice: Subject to any disclaimer, the term of this patent is extended or adjusted under 35 U.S.C. 154(b) by 1075 days.

(21) Appl. No.: 11/380,613

(22) Filed: Apr. 27, 2006

(65) Prior Publication Data

US 2006/0248137 A1 Nov. 2, 2006

Related U.S. Application Data

(60) Provisional application No. 60/675,752, filed on Apr. 27, 2005.

(51) Int. Cl.
*G06F 7/38* (2006.01)
*G06F 7/42* (2006.01)
*G06F 7/44* (2006.01)
*H04N 7/12* (2006.01)
*H04N 11/02* (2006.01)
*H04N 11/04* (2006.01)
(52) U.S. Cl. ........ 708/501; 708/503; 708/505; 708/495; 375/240.19

(58) Field of Classification Search .......... 708/495–499, 708/501, 503–505
See application file for complete search history.

(56) References Cited

U.S. PATENT DOCUMENTS

| 5,359,548 | A  | * | 10/1994 | Yoshizawa et al. | 708/505 |
| 6,233,595 | B1 | * | 5/2001  | Cheng et al.     | 708/503 |
| 6,701,337 | B1 | * | 3/2004  | Ide              | 708/501 |
| 6,721,773 | B2 | * | 4/2004  | Jennings, III    | 708/505 |
| 6,996,596 | B1 | * | 2/2006  | Ho et al.        | 708/495 |
| 7,529,789 | B2 | * | 5/2009  | Hansen et al.    | 708/403 |
| 7,546,330 | B2 | * | 6/2009  | Taunton          | 708/622 |
| 2003/0046322 | A1 | * | 3/2003 | Guevorkian      | 708/400 |

* cited by examiner

*Primary Examiner* — Lewis Bullock, Jr.
*Assistant Examiner* — Matthew Sandifer
(74) *Attorney, Agent, or Firm* — Earle Jennings

(57) ABSTRACT

A floating point (FP) shifter for use with FP adders providing a shifted FP operand as a power of the exponent base (usually two) multiplied by a FP operand. First arithmetic processor using at least one FP shifter with FP adder. FP adder for N FP operands creating FP result, where N is at least three. Second arithmetic processor including at least one FP adder for N operands. Descriptions of FP shifter and FP adder for implementing their operational methods. Implementations of FP shifter and FP adder.

14 Claims, 23 Drawing Sheets

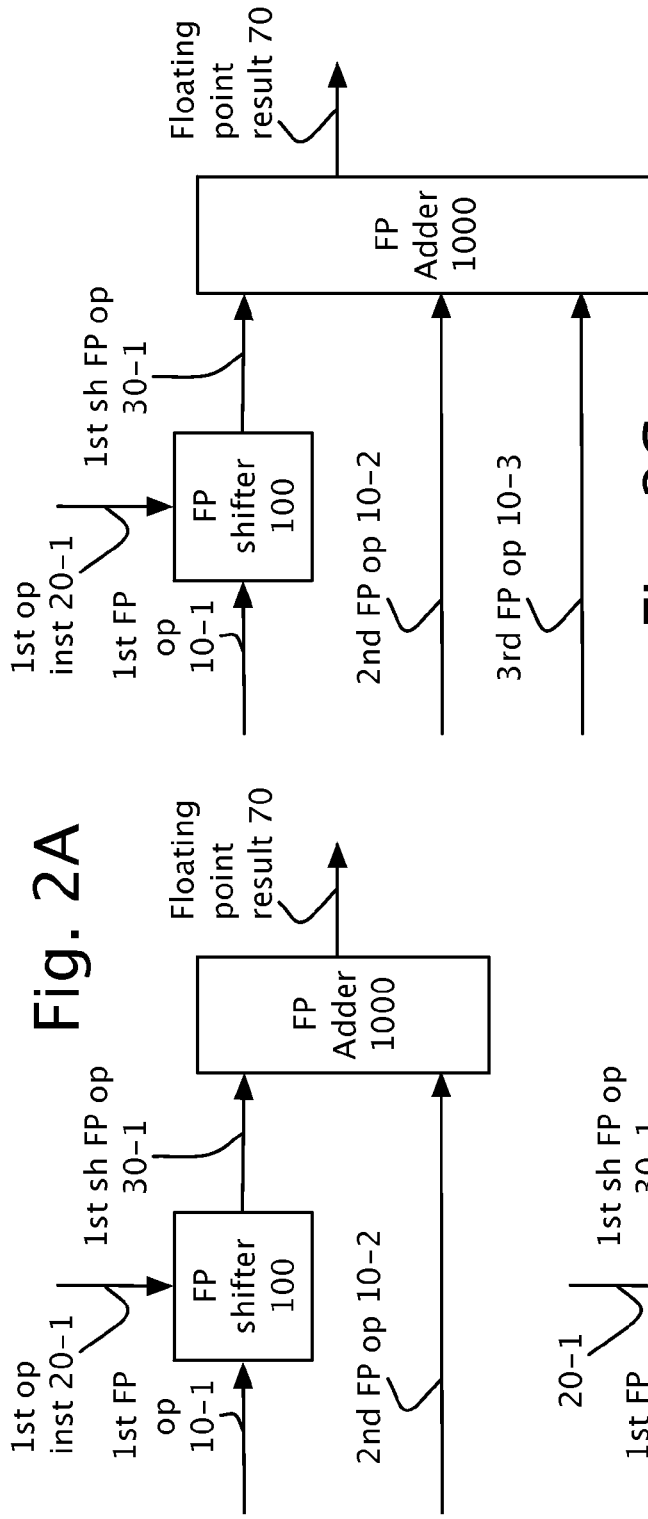
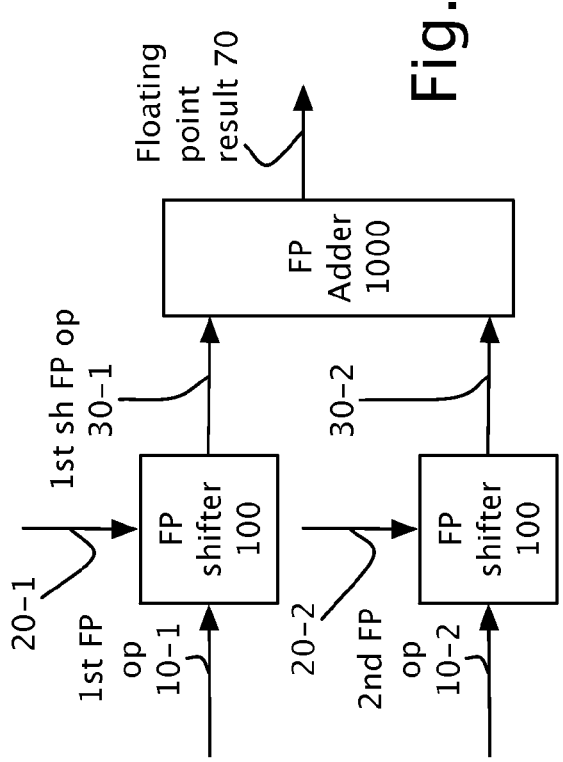

APPARATUS AND METHOD FOR IMPLEMENTING FLOATING POINT ADDITIVE AND SHIFT OPERATIONS

CROSS REFERENCE TO RELATED PATENT APPLICATIONS

This application claims priority to U.S. Provisional Patent Application Ser. No. 60/675,752, filed Apr. 27, 2005.

TECHNICAL FIELD

This invention relates to floating point arithmetic processing mechanisms and their methods of operation and use, in particular to mechanisms supporting simultaneous operation upon more than two operands and/or supporting the multiplication of an operand by a power of of the exponent base, which is frequently two, analogously to shifting a fixed point operand.

BACKGROUND OF THE INVENTION

Floating point arithmetic has been built into many computing devices since the 1950's and has often been preferred for many scientific, engineering and financial calculations. In some ways, it has mimicked fixed point or integer arithmetic. The mathematical operations of addition, subtraction, multiplication and division are well supported in traditional floating point literature. The literature is vast, and at this time, nearly static with little fundamental growth being reported.

Fixed point arithmetic has always had some operations which it did much better than floating point. It has long been possible to build fixed point adders of more than two fixed point numbers. It has long been possibly to multiply a fixed point number by a power of two in an adder, merely by shifting the bits of the fixed point number. Neither of these statements are true for floating point arithmetic processors. What is needed are floating point arithmetic processing elements which can add more than two floating point operands, and which can effectively multiply a floating point operand by a power of two, creating a shifted floating point operand.

The use of inexpensive shifting of fixed point numbers in fixed point adders has been used extensively in the development of wavelet filter banks. While fixed point arithmetic is not as good at preserving the precision of small values, it is cheap. New arithmetic processors are needed that are comparably capable of supporting wavelet filter banks.

While it is possible with multiple conventional, floating point adders to add more than two floating point operands together, this is done at a large cost in terms of control, communication, circuitry, power and heat dissipation. Floating point arithmetic processors are needed which minimize both the control and communication overhead for such operations using less circuitry, consuming less power, and dissipating less heat.

SUMMARY OF THE INVENTION

The invention includes a floating point shifter receiving a floating point operand to create a shifted floating point operand, for use in a floating point adder. The floating point shifter operates by altering an exponent included in the floating point operand to create an altered exponent. When the altered exponent is below a dirty-zero-threshold, the first shifted floating point operand is formed as zero. When the altered exponent is above the dirty-zero-threshold, the altered exponent and the mantissa included in the floating point operand are packaged as the shifted floating point operand.

Altering the exponent may include altering the exponent based upon a shift operand instruction. The shift operand instruction may include a signed integer, which is added to the exponent to create the altered exponent.

The invention includes a floating point adder receiving at least two floating point operands to create a floating point result. and including at least one of the invention's floating point shifters receiving a first floating point operand to create a first shifted floating point operand used in the rest of the floating point adder.

The invention also includes a floating point adder receiving at least three floating point operands to create a floating point result. Assume that N floating point operands are received, where N is at least three. The floating point adder operates as follows. The N floating operands are received to create the floating point result. An extended block comparison of a corresponding floating point operand creates a mantissa control, for each of the N floating point operands, and creates a base exponent. Mantissa aligning is performed for the corresponding floating point operand based upon the mantissa control to create an aligned mantissa, for each of the N floating point operands. Mantissa adding the N aligned mantissas to create a raw mantissa result. Rounding the raw mantissa result to create a rounded mantissa result and an exponent delta. Adding the base exponent to the exponent delta to create an exponent result. And output packaging the exponent result and the rounded mantissa result to create the floating point result.

The floating point adder may be implemented as the means for performing these operations. An extended block operand comparator may implement the means for the extended block comparison, and may include comparisons of each pair of the corresponding floating point operands to form partial maximums, and then all of these partial maximums compared to create the base exponent. Implementations may vary in terms of the mantissa controls and how they are generated, depending upon the implementation of the extended mantissa alignment mechanism. An extended mantissa alignment mechanism may include the means for mantissa aligning the corresponding floating point operands. Each aligned mantissa preferably includes the sign information of their corresponding floating point operand.

Mantissa adding the N aligned mantissas to create a raw mantissa result may be implemented in a variety of methods. The aligned mantissas are preferably in a signed integer format and may be added by any of the several techniques for performing this operation. By way of example, this may include mantissa compressing the N aligned mantissas to create the first combined mantissa and a second combined mantissa, and dual mantissa adding the first combined mantissa and the second combined mantissa to create the raw mantissa result.

A mantissa compressor may provide the means for compressing the N aligned mantissas to create the first and second combined mantissas. The aligned mantissas and the combined mantissas are often and preferably in a signed integer or fixed point notation. Adding these together to form the two combined mantissas can be done in a variety of ways, which are well known in the art. By way of example, a single column of full adders may be used to implement a means for compressing 3 aligned mantissas, where each full adder receives the same position's bit of each of the three aligned mantissas. The sum output of each full adder provides the bits of the first combined mantissa. The carry output of a bit position's full adder provides the bit of the next higher position of the second combined mantissa. The dual mantissa adder may preferably adds the two combined mantissas to create the raw mantissa result.

An extended floating point output stage may include implementations for rounding, exponent adjustment and output packaging. Means for rounding the raw mantissa result to create a rounded mantissa result and an exponent delta. Means for adding the base exponent to the exponent delta to create an exponent result. And means for output packaging the exponent result and the rounded mantissa result to create the floating point result.

The invention includes a first arithmetic processor including at least two floating point adders, at least one of which uses at least one of the floating point shifters to create a shifted floating point product from a floating point product received by the arithmetic processor. The arithmetic processor provides an optimized floating point target for discrete wavelet filters, which until now tended to be limited to fixed point real time implementations, because multiplying by powers of two required a floating point multiplier.

The first arithmetic processor may further include more than two floating point adders. Preferably, each of these floating point adders may use at least one floating point shifter. These floating point shifters may preferably each receive a shift operand instruction. The floating point shifters may or may not be included in the floating point adders. The floating point adders may also use interface circuits supporting sign control and enabling of the use of the floating point product.

The invention includes a second arithmetic processor including at least one of the floating point adders receiving N floating point operands, where N is at least three. One of these floating point adders replaces at least two of the old floating point adders in summing N floating point operands. The second arithmetic processor is fundamentally more efficient in real time than previous alternatives using the old floating point adders with just two inputs.

When N is three, which is used in the examples, each floating point adder is about forty percent larger than the old floating point adders, based on gate count estimates using the assumptions of a typical standard cell library. Adding three floating point numbers requires two of the old floating point adders, whereas this can be achieved with just one of the invention's floating point adders. This operation is commonly needed in a variety of setting, including the calculation of the distance between two vectors in a 3-dimensional space and the dot product of two of these vectors, frequently performed operations in a variety of visualization and frame generation graphics applications. The gate count for the one 3 operand floating point adder is 1.4 X, whereas the old floating point adders require 2X, where X is the gate count of the old floating point adder. The situation is actually worse than this. Operands need to be communicated to each of the two old floating point adders to arrive at different times, and the results of one adder made available to the second simultaneously with the arrival of the third operand, which is a much bigger demand on the communications and control circuitry that just having the operands arrive at one place, the invention's floating point adder to perform one operation and be done with the process.

When more floating point operands need to be added the advantages are even greater. It take seven of the old floating point adders arranged in three pipe stages to add 8 floating point operands, whereas four 3 input floating point adders arranged in two pipe stages can add nine floating point operands.

The second arithmetic processor may further include at least two of the inventions floating point adders, each with the independent ability to select from various shared operands which operands to use, control the signs of the used operands, and enable or disable their use, for each of these floating point adders. This pair of 3 input floating point adders is capable of performing what as quadrant offset adds of the four partial products needed for a complex multiplication of two complex numbers represented by floating point real and imaginary components, which a central operation needed to optimize the performance of a radix four step in a complex Fast Fourier Transform (FFT).

Preferably, the second arithmetic processor may further include at least eight of these at least 3 input floating point adders, each with independent selection, sign control, and enable/disable capabilities. Preferably, the second arithmetic process is organized into two pipe stages with at least four of the invention's floating point adders in the first pipe stage and at least four of these adders in the second stage, further supporting the ability to add many floating point operands.

Preferably, both the first arithmetic processor and the second arithmetic processor further include a local memory closely coupled to each of their floating point adders, removing the need for a communication scheme to a distant memory for communication of partial accumulations.

Preferably the invention's floating point adders in the second arithmetic processor each include at least one, and preferably, at least two of the floating point shifters enabling the second arithmetic processor to concurrently perform multi-tap discrete wavelet filter calculations in continuously on more than one product.

Each of the floating point operands, the shifted floating point operands, and the floating point result include an exponent and a mantissa. The floating point operands may all be instances of the same numeric format. The floating point result may be an instance of the same numeric format, or alternatively, be an instance of a distinct, second numeric format.

A floating point number including the exponent E and mantissa M may represent $2^E F(M)$. This form of representation is commonly used in a variety of floating point numeric formats. However, the invention also applies to floating point representations of the form $K^E F(M)$, where K may be a power of two, or another integer, such as 3, 7, or 15.

The numeric format may store the exponent in an offset exponent format. By way of example, single precision floating based upon the Institute for Electrical and Electronic Engineering (IEEE) floating point standard (ANSI-754) includes a single precision floating point format for "normal numbers" where the exponent is represented by the offset exponent subtracted from 128.

The numeric format may further include a sign bit, which is used with the mantissa in both block comparison operations and aligning the mantissas.

The numeric format may further include a denormal numeric format. In IEEE standard floating point, the thirty two bit version sets the exponent to −128, and if the mantissa is non-zero then the denormal representation is $2^{-128-23}M$. Zero is represented by the exponent being −128 and the mantissa 0.

The numeric format may also include representations of infinity, negative infinity, and may further include representations indicating Not-A-Number.

The numeric format may have a length of at least 16 bits. In certain embodiments, the numeric format length may preferably be any of the following: 22, 32, 48, 64, 80, 128, and 256 bits.

BRIEF DESCRIPTION OF THE DRAWINGS

FIGS. 2A to 4 show the use of the invention's floating point shifter with various floating point adders;

FIGS. 14 to 16B show some details of an extended operand comparator for use with the extended mantissa alignment mechanism of FIG. 11B;

DETAILED DESCRIPTION

This invention relates to floating point arithmetic processing mechanisms and their methods of operation and use, in particular to mechanisms supporting simultaneous operation upon more than two operands and/or supporting the multiplication of an operand by a power of of the exponent base, which is frequently two, analogously to shifting a fixed point operand.

Figure 1:
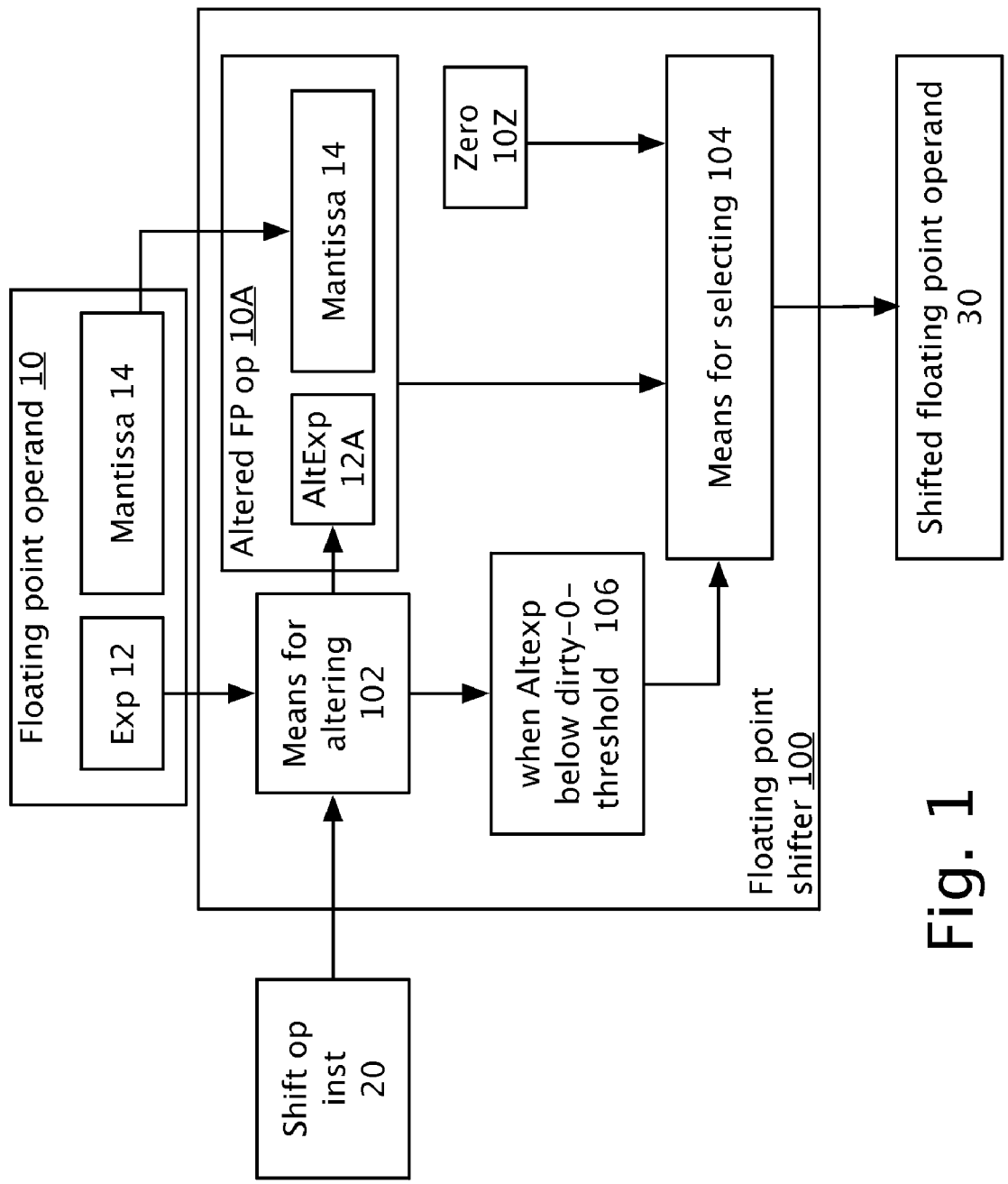
FIG. 1 shows an example of the invention's floating point shifter.

The invention includes a floating point shifter 100 shown in FIG. 1 receiving a floating point operand 10 to create a shifted floating point operand 10, for use with a floating point adder 1000, as shown in FIGS. 2A to 4, 6, and 8. The floating point shifter operates by altering an exponent 12 included in the floating point operand to create an altered exponent 12A. When the altered exponent is below a dirty-zero-threshold 106, the first shifted floating point operand is formed as zero 10Z. When the altered exponent is above the dirty-zero-threshold, the altered exponent and the mantissa included in the floating point operand are packaged as an altered floating point operand 10A to the shifted floating point operand.

Embodiments of the invention may include a sign bit in the floating point operand 10 will also include that sign bit in the shifted floating point operand 30 when the altered exponent 12A is above the dirty-zero-threshold 106.

Altering 102 the exponent 12 may include altering the exponent based upon a shift operand instruction 20. The shift operand instruction may include a signed integer, which may preferably be added to the exponent to create the altered exponent 12A.

Embodiments of the floating point shifter 100 may be compatible with numeric formats supporting denormals, such as the IEEE floating point standard. These floating point shifters may preferably further include detection of when the altered exponent 12A be above the dirty-zero-threshold and the denormal-threshold, causing the altered floating point operand 10A to be repackaged in the denormal format.

By way of example, for embodiments of the floating point shifter 100 supporting a 32 bit IEEE floating point compatible numeric format using only normals, and not supporting denormals, the dirty-zero-threshold is one. For embodiments also supporting denormals, the dirty-zero-threshold is −22 and the denormal threshold is one. This assumes that the test for the altered exponent 12A being below the dirty-zero-threshold is a test for less than. When the test is for less than or equal, then the dirty-zero-threshold is zero when denormals are not supported, and −23 when they are.

Embodiments of the floating point shifter 100 may be compatible with numeric formats supporting infinities, usually a positive infinity and a negative infinity, often designated by single exponent value, which will be referred to herein as the infinity exponent. Such embodiments may also support Not-A-Number (NAN). Overall, when the floating point operand 10 is an infinity, the shifted floating point operand 30 is that infinity. When the floating point operand is a NAN, the shifted floating point operand is a NAN.

When the altered exponent 12A is greater than or equal to the infinity exponent, and the floating point operand 10 is neither an infinity nor a NAN, then the altered floating point operand is packaged as the sign appropriate infinite floating point number to create the shifted floating point operand 30.

Figure 23B:
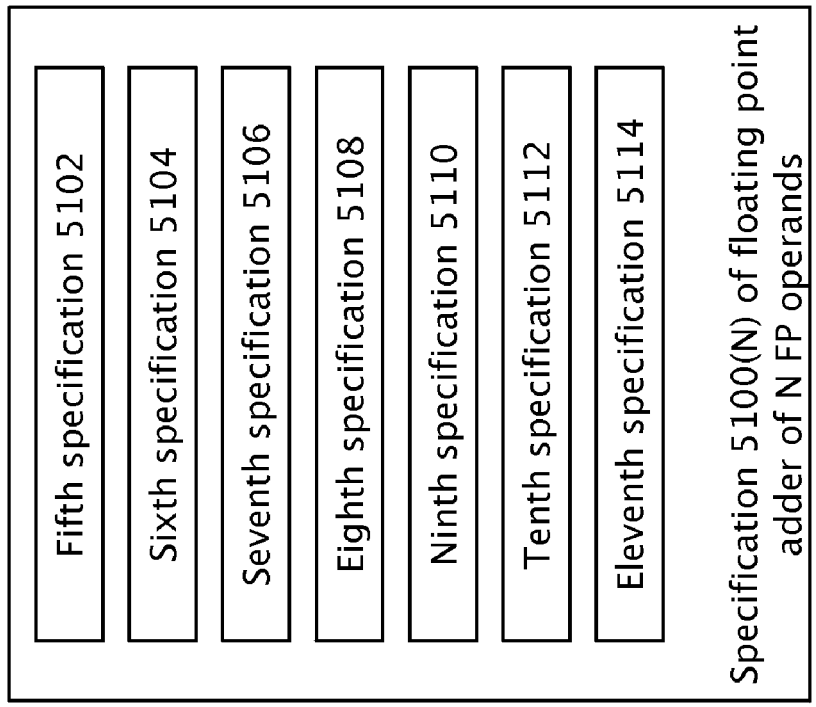
FIG. 23B shows a specification of the floating point adder for N floating point operands.
Figure 23A:
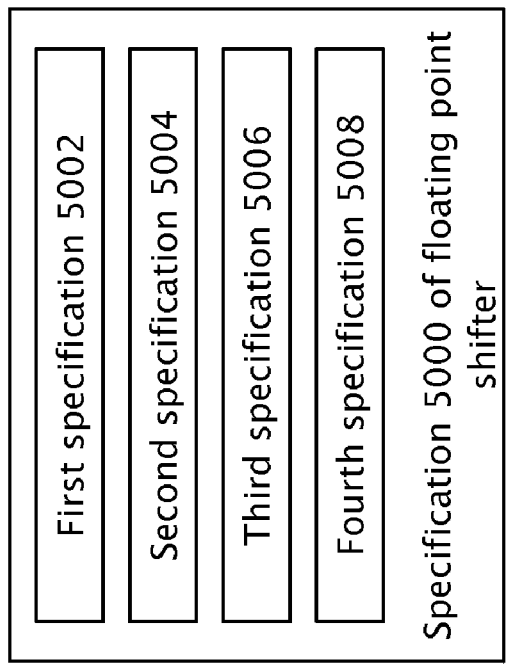
FIG. 23A shows a specification of the floating point shifter.

The invention includes a floating point shifter specification 5000 shown in FIG. 23A of the circuitry implementing the operations of the floating point shifter 100 of FIG. 1. The specification may include a first specification 5002 disclosing the receiving the floating point operand 10 to create the shifted floating point operand 30, which may be represented as an input port and an output port in certain embodiments, and may not be present in others. The specification preferably includes a second, third, and fourth specification. The second specification 5004 discloses altering said exponent 12 to create said altered exponent 12A. The third specification 5006 disclosing forming zero 10Z as said first shifted floating point operand when said altered exponent is below said dirty-zero-threshold. The a fourth specification 5008 disclosing packing said altered exponent and said mantissa 14 to create said first shifted floating point operand when said altered exponent is above said dirty-zero-threshold.

The invention further includes at least one of the second, third, and fourth specifications including at least one expression in at least one member of the specification language group consisting of a version of a hardware description language, a version of a netlist specification, and a version of a programming specification for a programmable logic device. Where the programmable logic device is a member of the group consisting of: a programmable resource, and a programmable network of at least two of said programmable resources. Where the programmable resource includes at least one instance of at least one member of the group consisting of: a programmable arithmetic circuit, a programmable logic array, a programmable memory array, and a programmable register block. And where the hard description language includes at least one of a VHDL, a Verilog, and a SystemC.

The invention includes a floating point adder 1000 receiving at least two floating point operands to create a floating point result 70, and including at least one floating point shifter 100 receiving a first floating point operand 10-1 to create a first shifted floating point operand 30-1 used in the rest of the floating point adder, as shown in FIGS. 2A to 4, 6, and 8.

The invention also includes a floating point adder 1000(N) using at least three floating point operands to create a floating point result 70, as shown in FIGS. 5 to 9. Assume that N floating point operands are received, where N is at least three. The floating point adder operates as follows. An extended block comparison 210 of a corresponding floating point operand creates a mantissa control 302, for each of the N floating point operands, and creates a base exponent 230. Mantissa aligning 310 is performed for the corresponding floating point operand based upon the mantissa control to create an aligned mantissa 40, for each of the N floating point operands. Mantissa adding 410 the N aligned mantissas to create a raw mantissa result 46. Rounding 510 the raw mantissa result to create a rounded mantissa result 60 and an exponent delta 62. Exponent adding 520 the base exponent to the exponent delta to create an final exponent 50. And output packaging 530 the final exponent and the rounded mantissa result to create the floating point result 70.

In many embodiments, the N floating operands are received by the floating point adder 1000 to create the floating point result 70. This may not be the situation when the floating point adder is integrated into a larger circuit which does not have specific input and output ports and/or registers for the floating point adder.

The floating point adder 1000 may be implemented as the means for performing these operations. An extended block operand comparator 210(N) as shown in FIGS. 5 to 9 may implement the means for the extended block comparison 210, and may include comparisons of each pair of the corresponding floating point operands to form partial maximums, and then all of these partial maximums compared to create the base exponent, as shown in FIGS. 14 to 16B. Implementations may vary in terms of the mantissa controls and how they are generated, depending upon the implementation of the extended mantissa alignment mechanism. An extended mantissa alignment mechanism 310(N) may include the means for mantissa aligning 310 the corresponding floating point operands. Each aligned mantissa 40 preferably includes the sign information of their corresponding floating point operand.

Figure 5:
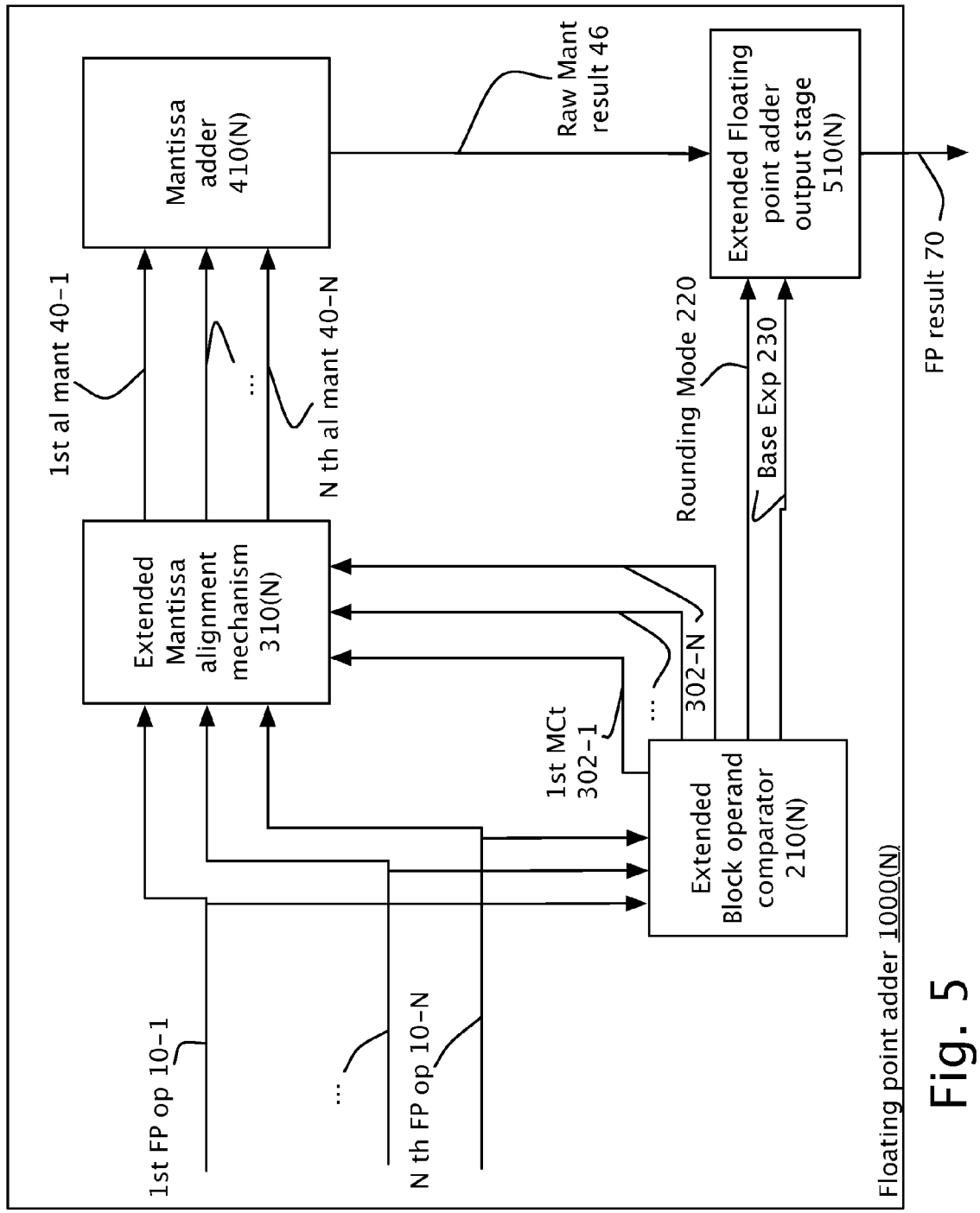
FIGS. 5 to 9 show various examples of the invention's floating 5 point adder receiving N floating point operands, where N is at least three.
Figure 6:
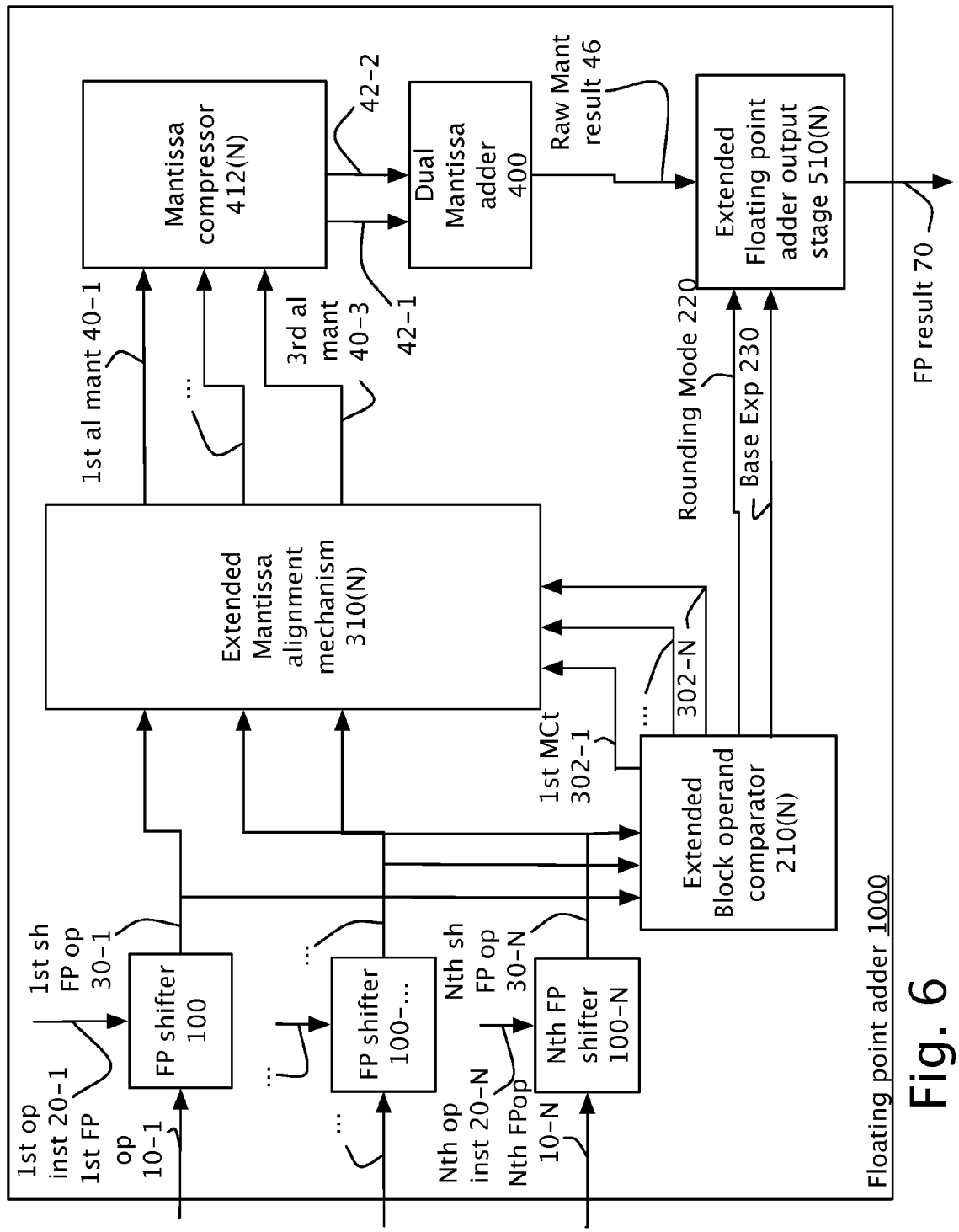

Mantissa adding 410 the N aligned mantissas as shown in FIG. 5 to create a raw mantissa result 46 may be implemented in a variety of methods. Each aligned mantissa 40 is preferably in a signed integer format and may be added by any of the several techniques for performing this operation. By way of example, this may include mantissa compressing 412(N) the N aligned mantissas to create a first combined mantissa 42-1 and a second combined mantissa 42-2, and dual mantissa adding 400 the first combined mantissa and the second combined mantissa to create the raw mantissa result. Examples of this approach are shown in FIGS. 6 to 9.

A mantissa compressor 412(N) may provide the means for compressing the N aligned mantissas 40-1, ..., N to create the first combined mantissa 42-1 and the second combined mantissa 42-2. The aligned mantissas and the combined mantissas are often and preferably in a signed integer or fixed point notation. Adding these together to form the two combined mantissas can be done in a variety of ways, which are well known in the art.

Figure 7:
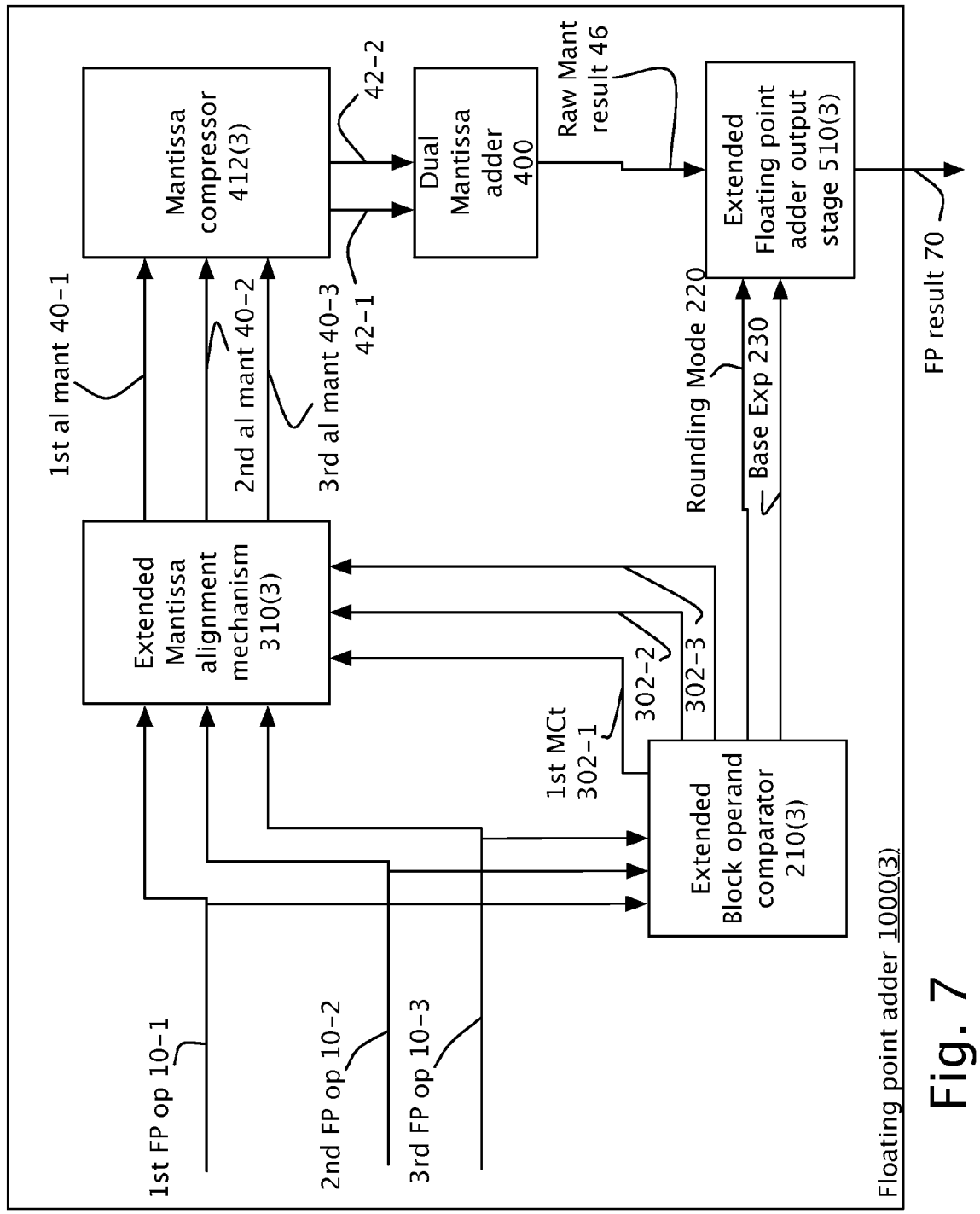
Figure 8:
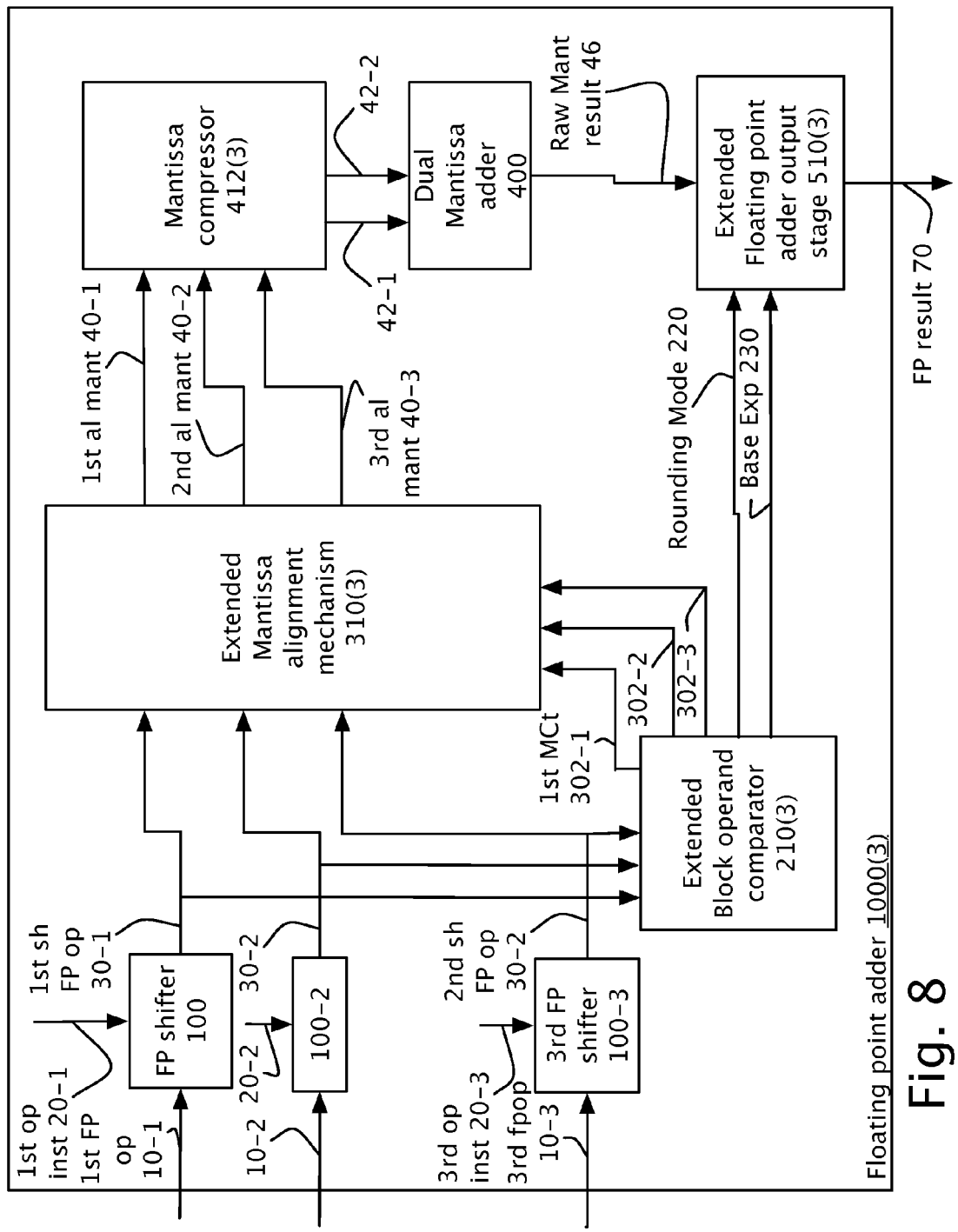
Figure 9:
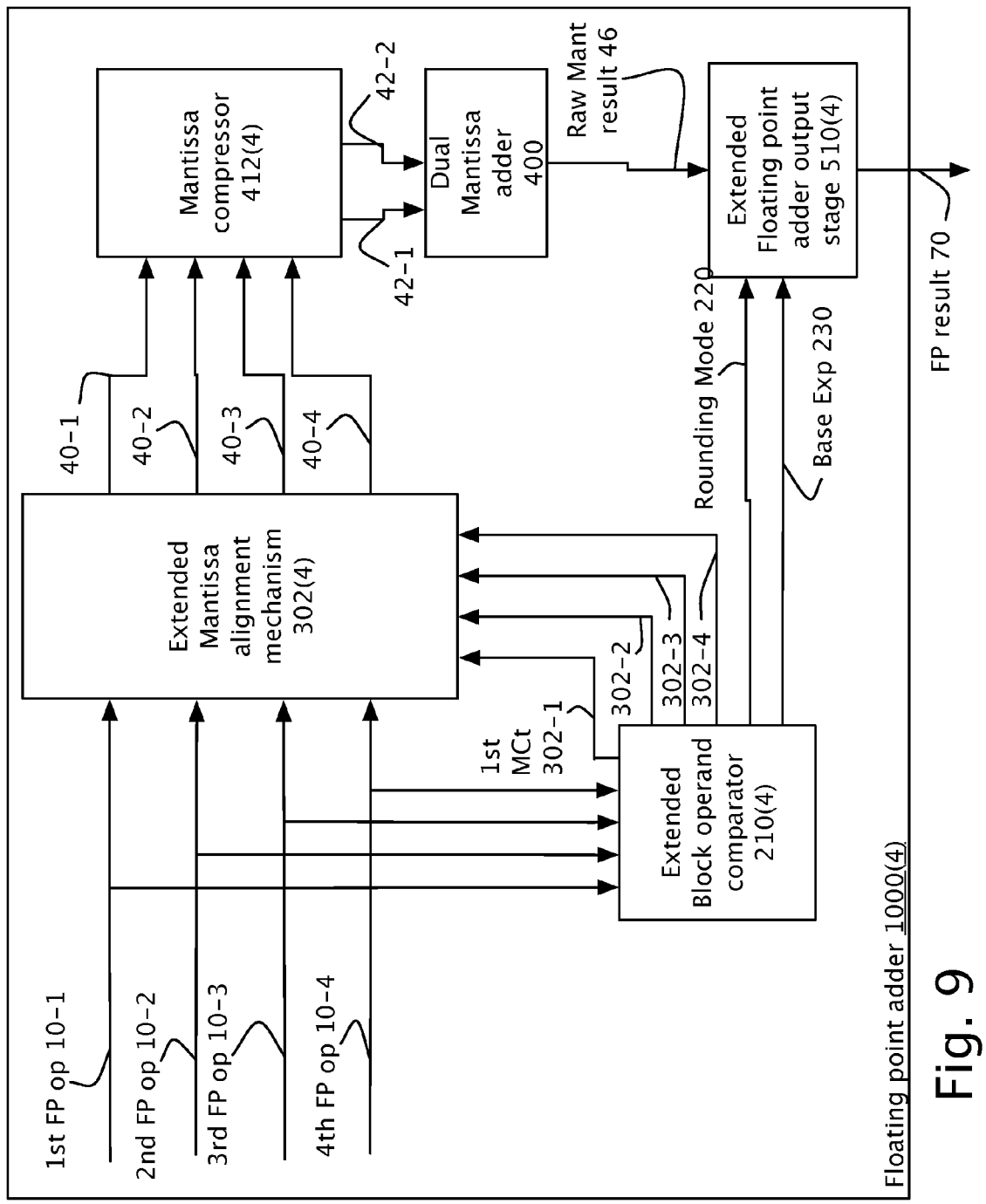

By way of example, when N=3, the mantissa compressor 412(N) of FIG. 7 may include a single column of full adders may be used to implement a means for compressing the N aligned mantissas 40-1, ..., N, where each full adder receives the same position's bit of each of the three aligned mantissas. The sum output of each full adder provides the bits of the first combined mantissa 42-1. The carry output of a bit position's full adder provides the bit of the next higher position of the second combined mantissa 42-2. The dual mantissa adder 400 may preferably adds the two combined mantissas to create the raw mantissa result 46.

Figure 18:
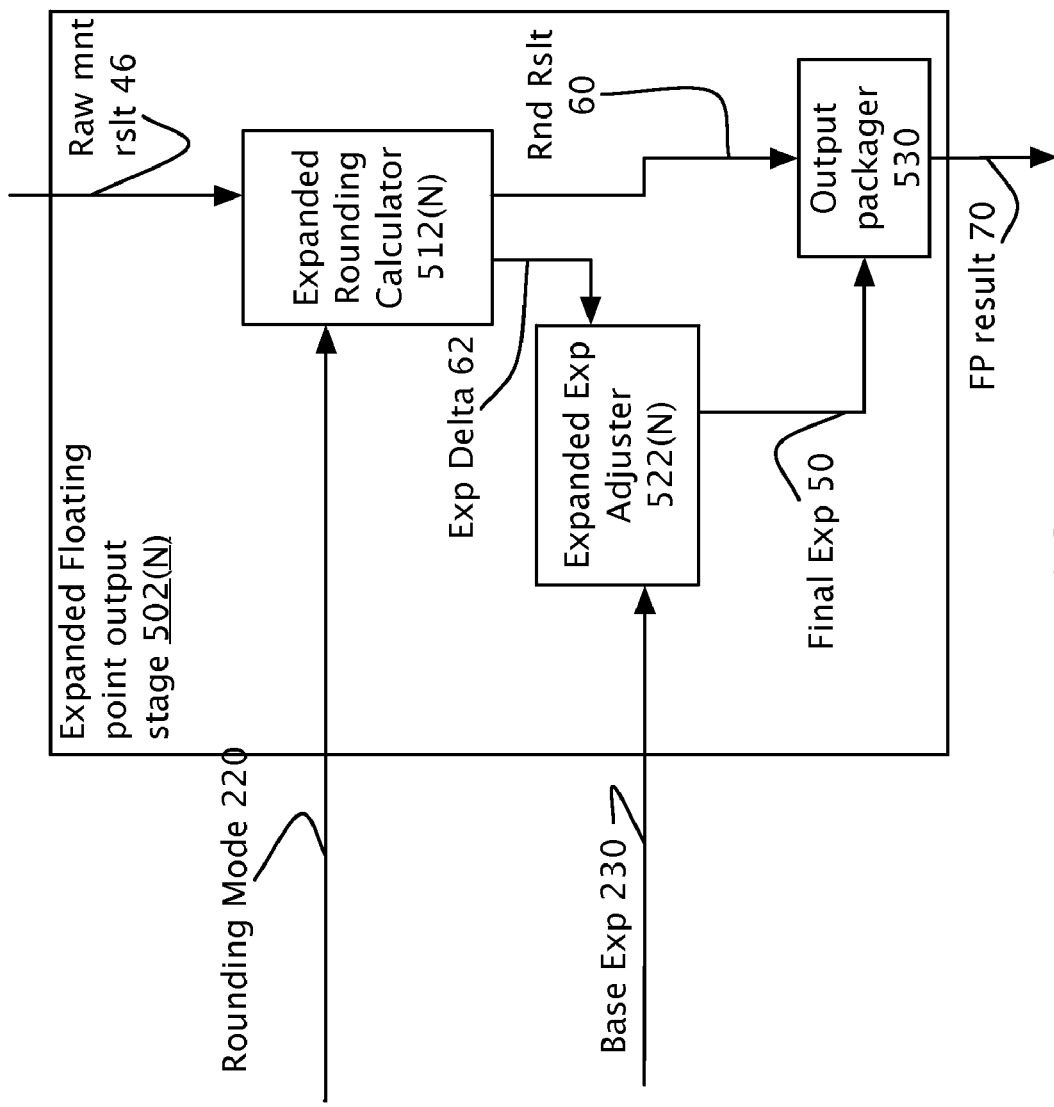
FIG. 18 shows some details of the floating point output stage of FIGS. 5 to 9.

An extended floating point output stage 510(N) may include implementations for rounding, exponent adjustment and output packaging as shown in FIG. 18. Means for rounding 510 the raw mantissa result 46 preferably creates the rounded mantissa result 60 and the exponent delta 62. Means for exponent adding 520 the base exponent 230 to the exponent delta preferably creates the final exponent 50. And means for output packaging 530 the final exponent and the rounded mantissa result preferably creates the floating point result 70.

The invention includes a specification of the floating point adder 5100(N) using N floating point operands to create a floating point result as shown in FIG. 23B, where N is at least three. The specification of the floating point adder may or may not include the fifth specification, and preferably includes the sixth through twelfth specifications. The fifth specification 5102, which may not be present in certain embodiments, disclosing receiving the N corresponding floating point operands to provide the floating point result 70. The sixth specification 5104 disclosing extended block comparing 210 said corresponding floating point operand to create a mantissa control 302, for each of said N of said floating point operands 10-1 to 10-N, and to create a base exponent 230. The seventh specification 5106 disclosing mantissa aligning 310 said corresponding floating point operand based upon said mantissa control to create said aligned mantissa, 40-1 to 40-N, for each of said N of said floating point operands. The eighth specification 5108 disclosing mantissa adding 410 said N of said aligned mantissas to create the raw mantissa result 46. The ninth specification 5110 disclosing rounding 510 said raw mantissa result to create the rounded mantissa result 60 and the exponent delta 62. The tenth specification 5112 disclosing exponent adding 520 said base exponent to said exponent delta to create the final exponent 50. The eleventh specification 5114 disclosing output packaging 530 said exponent result and said rounded mantissa result to create said floating point result.

As before, the invention further includes at least one of the sixth through eleventh specifications including at least one expression in at least one member of the specification language group consisting of a version of a hardware description language, a version of a netlist specification, and a version of a programming specification for a programmable logic device. Where the programmable logic device is a member of the group consisting of: a programmable resource, and a programmable network of at least two of said programmable resources. Where the programmable resource includes at least one instance of at least one member of the group consisting of: a programmable arithmetic circuit, a programmable logic array, a programmable memory array, and a programmable register block. And where the hard description language includes at least one of a VHDL, a Verilog, and a SystemC.

Figure 19:
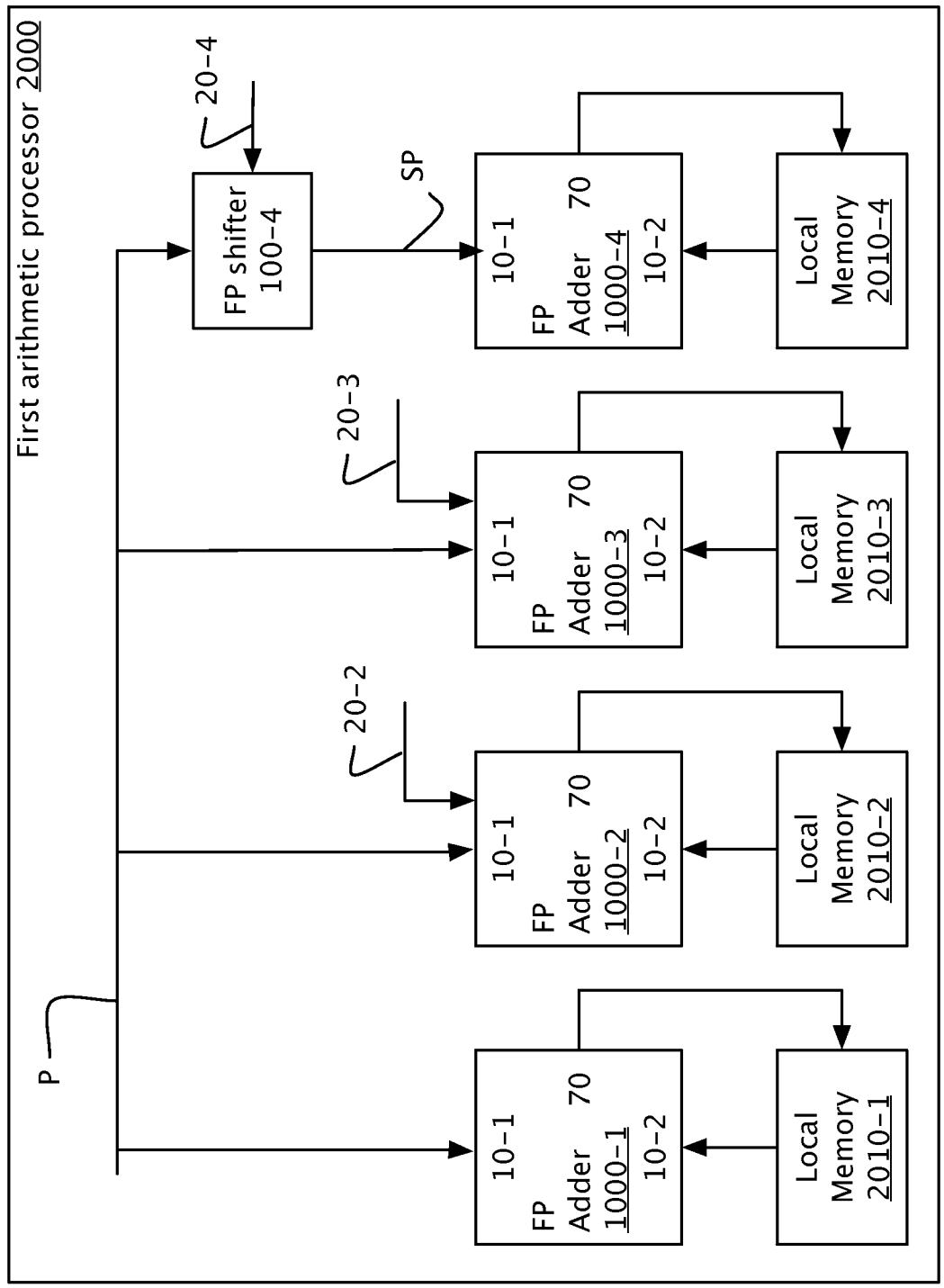
FIG. 19 shows an example of the use of the floating point shifter and floating point adders including floating point shifters in a discrete wavelet processor.

The invention includes a first arithmetic processor 2000 including at least two floating point adders, at least one of which uses at least one of the floating point shifter to create a shifted floating point product SP from a received floating point product P, as shown in FIG. 19. This arithmetic processor provides an optimized floating point target for discrete wavelet filters, which until now tended to be limited to fixed point real time implementations, because multiplying by powers of two required a floating point multiplier.

The first arithmetic processor 2000 may further, preferably, include more than two floating point adders. Preferably, each of these floating point adders may use at least one floating point shifter. These floating point shifters may preferably each receive a shift operand instruction 20. The floating point shifters may or may not be included in the floating point adders. The floating point adders preferably also support sign control and enabling the use of the floating point product.

By way of example, FIG. 19 shows a floating point product P being distributed to a first floating point adder 1000-1, a second floating point adder 1000-2, a third floating point adder 1000-3, and a fourth floating point shifter 100-4, which is used to provide a shifted floating point product SP to a fourth floating point adder 1000-4. The second floating point adder includes a floating point shifter, which is directed by a second shift operand instruction 20-2. The third floating point adder includes another floating point shifted directed by a third shift operand instruction 20-3. This Figure shows the first floating point adder not receiving a shift operand instruction. The first arithmetic processor may include at least one floating point adder which does not use the invention's floating point shifter.

However, in certain embodiments of the invention, all of the floating point adders would use their own floating point shifters. This would be preferable if the first arithmetic processor supported discrete wavelet filters requiring more of these shifted taps than there are floating point adders.

The invention includes a second arithmetic processor 3000 (N) including at least one of the floating point adders receiving N floating point operands, where N is at least three. One of these floating point adders replaces at least two of the old floating point adders in summing N floating point operands. The second arithmetic processor is fundamentally more efficient in real time than previous alternatives using the old floating point adders with just two inputs.

Figure 20B:
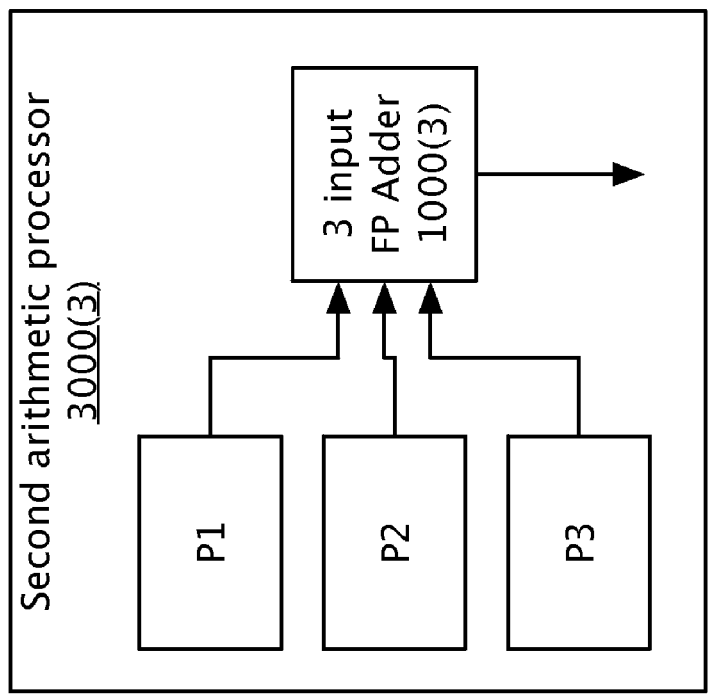
FIG. 20B shows the use of one of the invention's 3 input floating point adder to form the sum of three numbers.
Figure 20A:
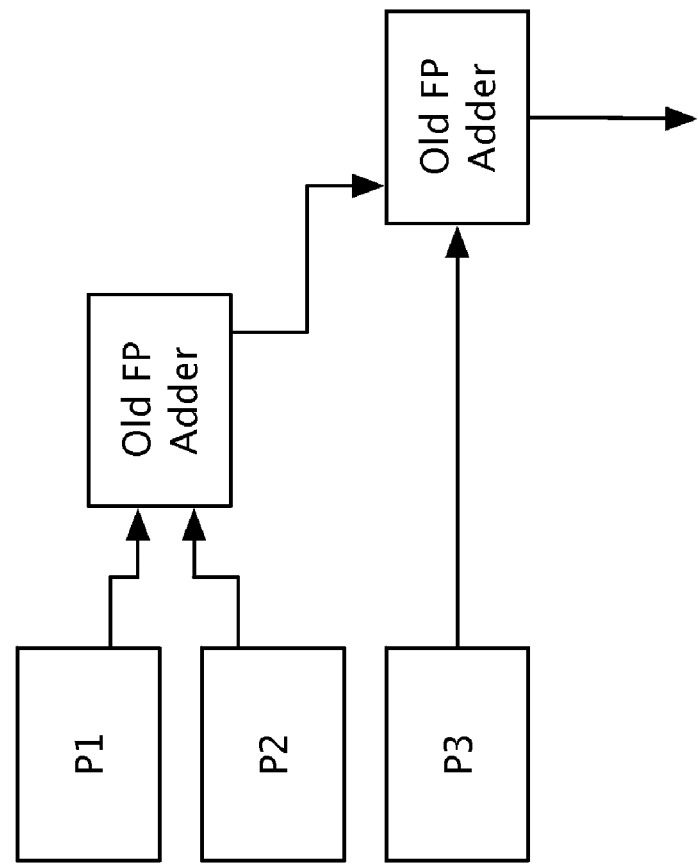
FIG. 20A shows the use of prior art 2 input floating point adders to form the sum of three numbers.

In the following example, N is three. Each floating point adder is about forty percent larger than the old floating point adders, based on gate count estimates using the assumptions of a typical standard cell library. Adding three floating point numbers, P1, P2, and P3 requires two of the old floating point adders as shown in FIG. 20A, whereas this can be achieved with just one of the invention's floating point adders as shown in FIG. 20B. This operation is commonly needed in a variety of setting, including the calculation of the distance between two vectors in a 3-dimensional space and the dot product of two of these vectors, frequently performed operations in a variety of visualization and frame generation graphics applications.

The gate count for the one 3 operand floating point adder 1000(3) is 1.4X, whereas the old floating point adders require 2X, where X is the gate count of the old floating point adder (Old FP Adder). The situation is actually worse than this. The operands need to be communicated to each of the two old floating point adders to arrive at different times, and the results of one adder made available to the second simultaneously with the arrival of the third operand, which is a much bigger demand on the communications and control circuitry that just having the all 3 operands arrive at one place, where the invention's floating point adder performs one operation and is done.

Figure 21B:
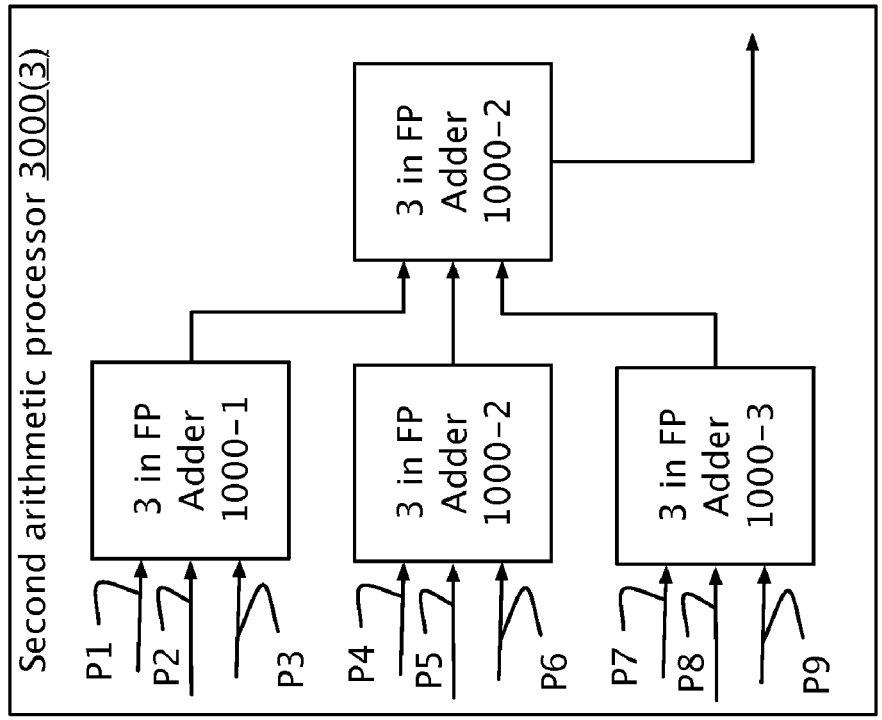
FIG. 21B shows the use of one of the invention's 3 input 5 floating point adder to form the sum of nine numbers.
Figure 21A:
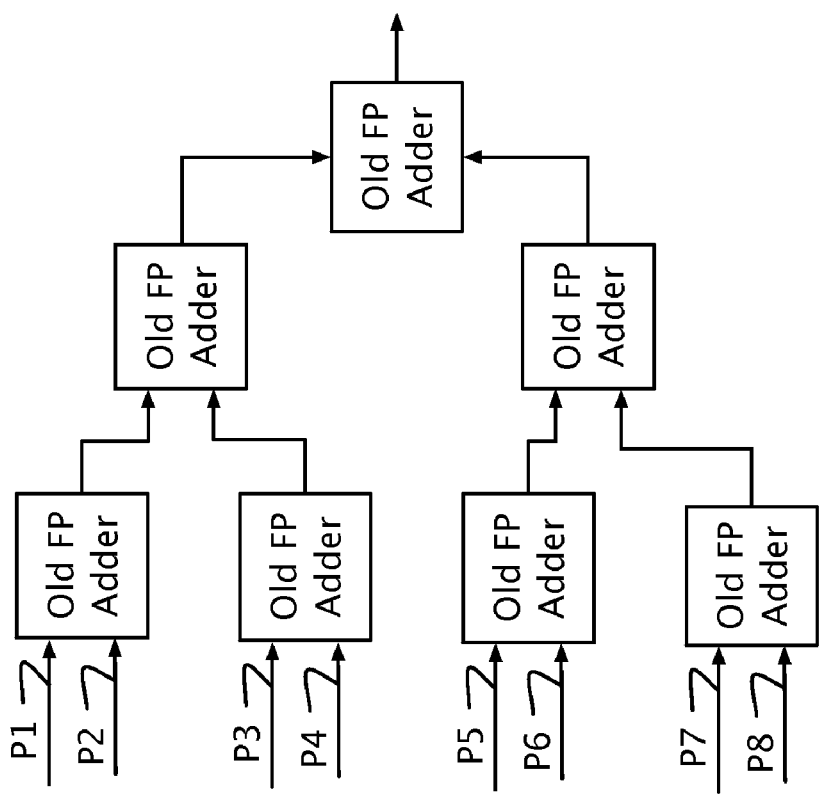
FIG. 21A shows the use of prior art 2 input floating point adders to form the sum of eight numbers.

When more floating point operands need to be added the advantages are even greater. It take seven of the old floating point adders arranged in three pipe stages to add 8 floating point operands P1 to P8 as shown in FIG. 21A, whereas four 3 input floating point adders arranged in two pipe stages can add nine floating point operands P1 to P9 as shown in FIG. 21B.

The second arithmetic processor 3000(N) may further include at least two instances of the 3 operand floating point adder 1000(3), each with the independent ability to select from various shared operands which operands to use, control the signs of the used operands, and enable or disable their use, for each of these floating point adders. This pair of 3 operand floating point adders is capable of performing what is sometimes referred to as quadrant offset adds of the four floating point products P1 to P4, which is needed for a complex multiplication of two complex numbers represented by floating point real and imaginary components. The quadrant offset add is a central operation needed to optimize the performance of a radix four step in a complex Fast Fourier Transform (FFT).

Preferably, the second arithmetic processor 3000(N) may further include at least eight instances of the 3 operand floating point adder 1000(3), labeled as 1000(3)-1 to 1000(3)-8, each with independent selection, sign control, and enable/disable capabilities. Preferably, the second arithmetic process is organized into two pipe stages with at least four of the invention's floating point adders in the first pipe stage and at least four of these adders in the second stage, further supporting the ability to add many floating point operands, as shown in FIG. 22.

Preferably, both the first arithmetic processor 2000 and the second arithmetic processor 3000(N) further include a local memory 2010 closely coupled to each floating point adder 1000, removing the need for a communication scheme to a distant memory for communication of partial accumulations.

By way of example, in FIG. 19, the first floating point adder 1000-1 is closely coupled to the first local memory 2010-1, the second floating point adder 1000-2 is closely coupled to the second local memory 2010-2, the third floating point adder 1000-3 is closely coupled to the third local memory 2010-3, and the fourth floating point adder 1000-4 is closely coupled to the fourth local memory 2010-4.

Figure 22:
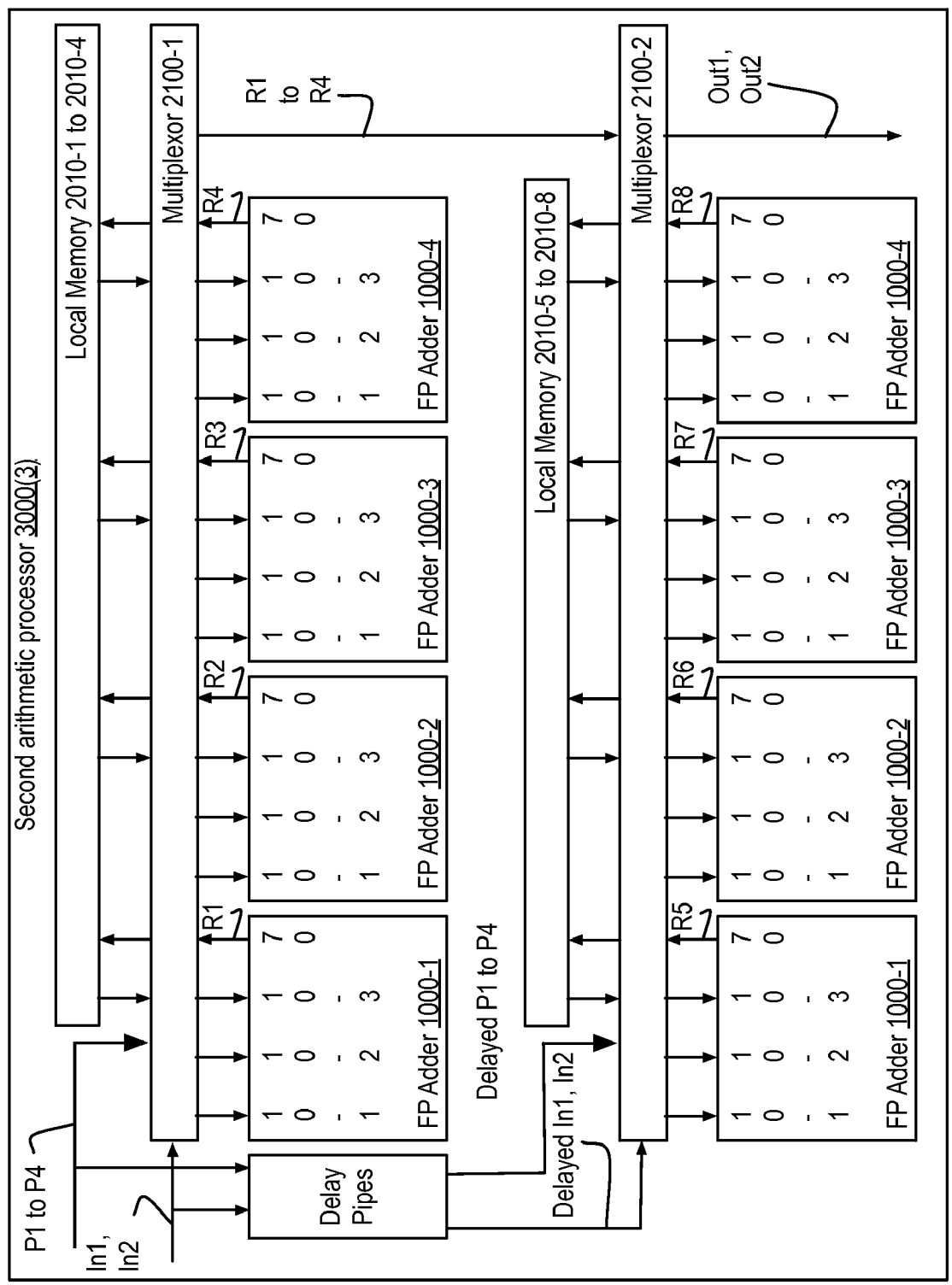
FIG. 22 shows the use of the invention's 3 input floating point adders in a floating point arithmetic processor capable of single pass radix 4 FFT calculations and adding up to nine floating point numbers in a single execution wave front through the first and second pipe stages of these floating point adders.

Similarly, in FIG. 22, the first floating point adder 1000(3)-1 is closely coupled to the first local memory 2010-1, the second floating point adder 1000(3)-2 is closely coupled to the second local memory 2010-2, the third floating point adder 1000(3)-3 is closely coupled to the third local memory 2010-3, and the fourth floating point adder 1000(3)-4 is closely coupled to the fourth local memory 2010-4.

Also in FIG. 22, the fifth floating point adder 1000(3)-5 is closely coupled to the fifth local memory 2010-5, the sixth floating point adder 1000(3)-6 is closely coupled to the sixth local memory 2010-6, the seventh floating point adder 1000(3)-7 is closely coupled to the seventh local memory 2010-7, and the eighth floating point adder 1000(3)-8 is closely coupled to the eighth local memory 2010-8.

The first multiplexer 2100-1 preferably provides independent selection of at least a first floating point input In1, a second floating point input In2, and at least four floating point product P1 to P4, as well as at least the closely coupled local memory 2010 for each of the 3 operand floating point adders 1000(3) organized as a first pipe stage.

The second multiplexer 2100-2 preferably provides independent selection of at least the time-delayed first floating point input In1, second floating point input In2, and at least four floating point product P1 to P4, the four floating point results R1 to R4 of the first pipe stage's floating point adders, as well as at least the closely coupled local memory 2010 for each of the 3 operand floating point adders 1000(3) organized as the second pipe stage.

Preferably at least one and more preferably, each instance of the invention's floating point adder 1000(3) in the second arithmetic processor 3000(N) include at least one, and preferably, at least two of instances the invention's floating point shifter 100 enabling the second arithmetic processor to concurrently perform multi-tap discrete wavelet filter calculations in continuously on more than one product P1 to P4.

Each of the floating point operands, the shifted floating point operands, and the floating point result preferably include an exponent 12 and a mantissa 14 as shown in FIG. 1. In certain embodiments of the invention the floating point operands may all be instances of the same numeric format. The floating point result 70 may be an instance of the same numeric format, or alternatively, be an instance of a distinct, second numeric format.

A floating point number including the exponent E and mantissa M may represent $2^E F(M)$. This form of representation is commonly used in a variety of floating point numeric formats. However, the invention also applies to floating point representations of the form $K^E F(M)$, where K may be a power of two, or another integer, such as 3, 7, or 15.

The numeric format may store the exponent in an offset exponent format. By way of example, single precision floating based upon the Institute for Electrical and Electronic Engineering (IEEE) floating point standard (ANSI-754) includes a single precision floating point format for "normal numbers" where the exponent is represented by the offset exponent subtracted from 128.

The numeric format may further include a sign bit, which is used with the mantissa in both block comparison operations and aligning the mantissas.

The numeric format may further include a denormal numeric format. In IEEE standard floating point, the thirty two bit version sets the exponent to −128, and if the mantissa is non-zero then the denormal representation is $2^{-128-23}M$. Zero is represented by the exponent being −128 and the mantissa 0.

The numeric format may also include representations of infinity, negative infinity, and may further include representations indicating Not-A-Number.

The numeric format may have a length of at least 16 bits. In certain embodiments, the numeric format length may preferably be any of the following: 22, 32, 48, 64, 80, 128, and 256 bits.

Returning to FIGS. 3, 4, the mantissa alignment mechanism 300 for the two operand floating point adder 1000 is shown in two example embodiments, which each use a different block operand comparator 200.

Figure 4:
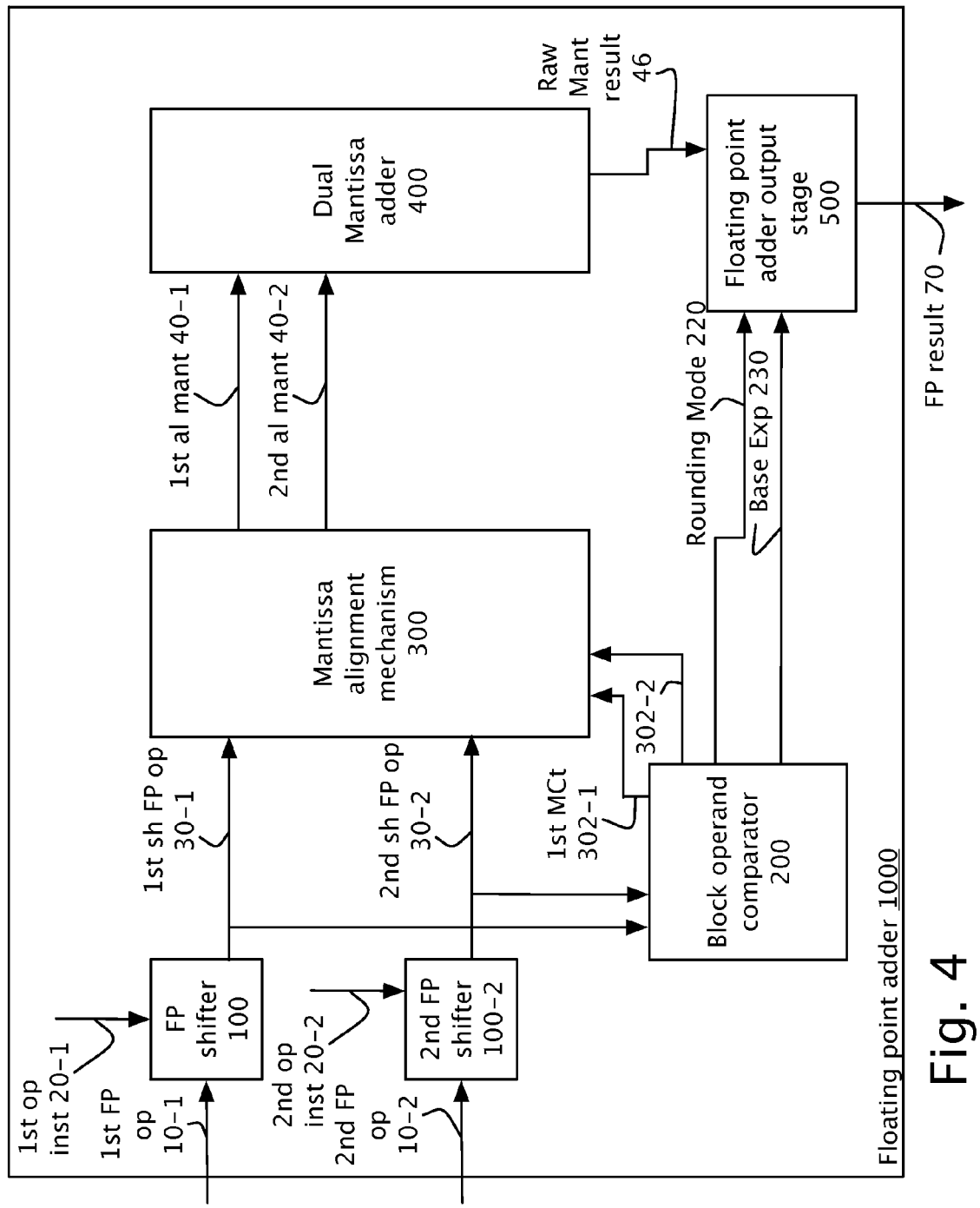
Figure 10:
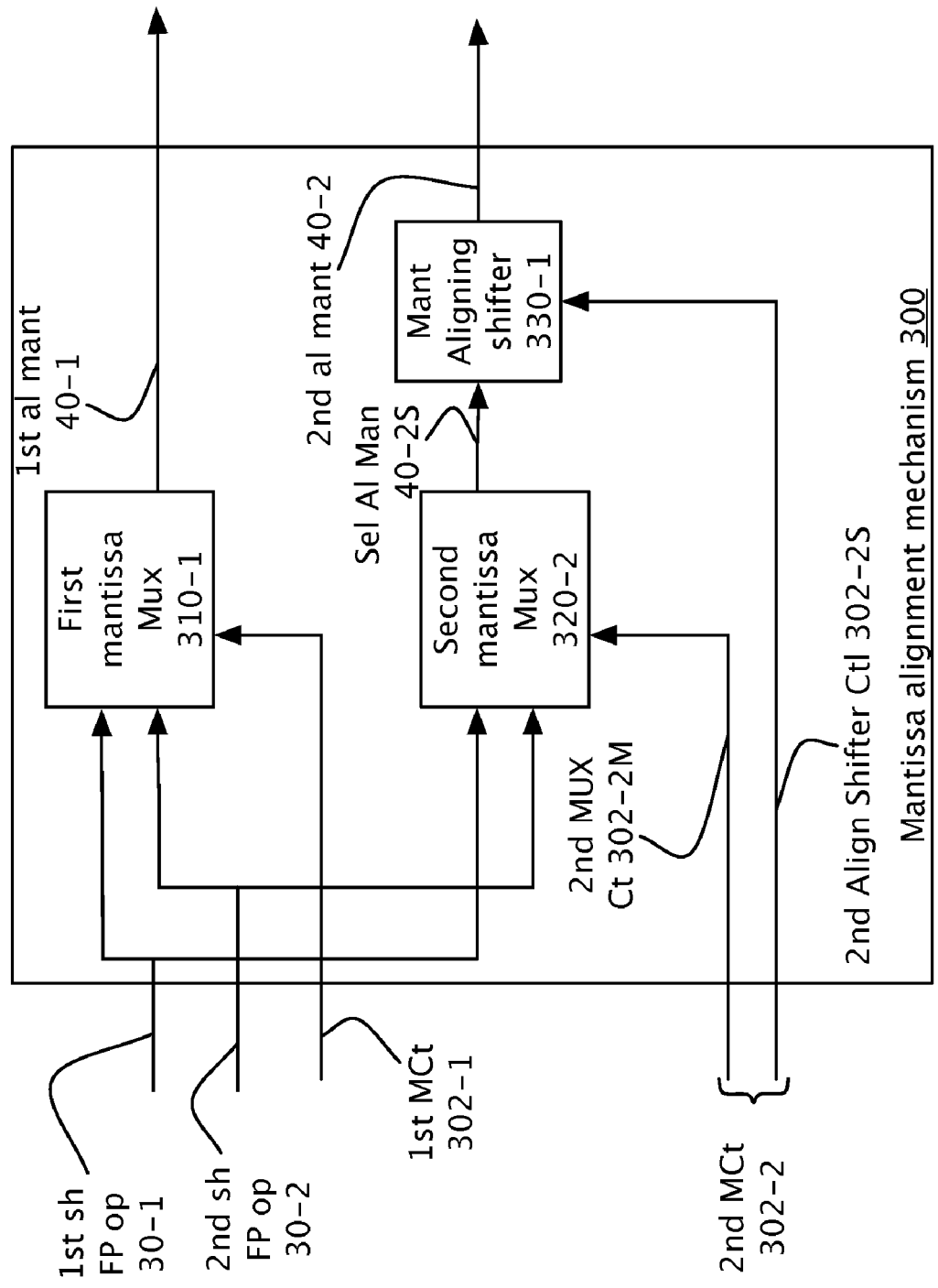
FIGS. 10 and 11A show two examples of a mantissa alignment mechanism of FIGS. 3 and 4.

FIG. 10 shows the mantissa alignment mechanism including a first mantissa multiplexer 310-1 directed by a first mantissa control 302-1 receiving two corresponding floating point operands, which in the case of FIG. 4, are the first shifted floating point operand 30-1 and the second shifted floating point operand 30-2 to create the first aligned mantissa 40-1, which in this embodiment of the floating point adder, is selected for the corresponding floating point operand with the largest exponent. The mantissa alignment mechanism also includes a second mantissa multiplexer 320-2 directed by a second mantissa multiplexer control 302-2M, receiving the same corresponding floating point operands as the first mantissa multiplexer, but selecting the opposite operand to create a selected aligned mantissa 40-2S provided to a mantissa aligning shifter 330, which is directed by an alignment shifter control 302-2S to create the second aligned mantissa 40-2. The second mantissa control 302-2 includes at least the alignment shifter control. In certain preferred embodiments, the second mantissa multiplexer control may be the first mantissa multiplexer control, which is used in a complementary fashion by the second mantissa multiplexer to its use by the first mantissa multiplexer.

Figure 3:
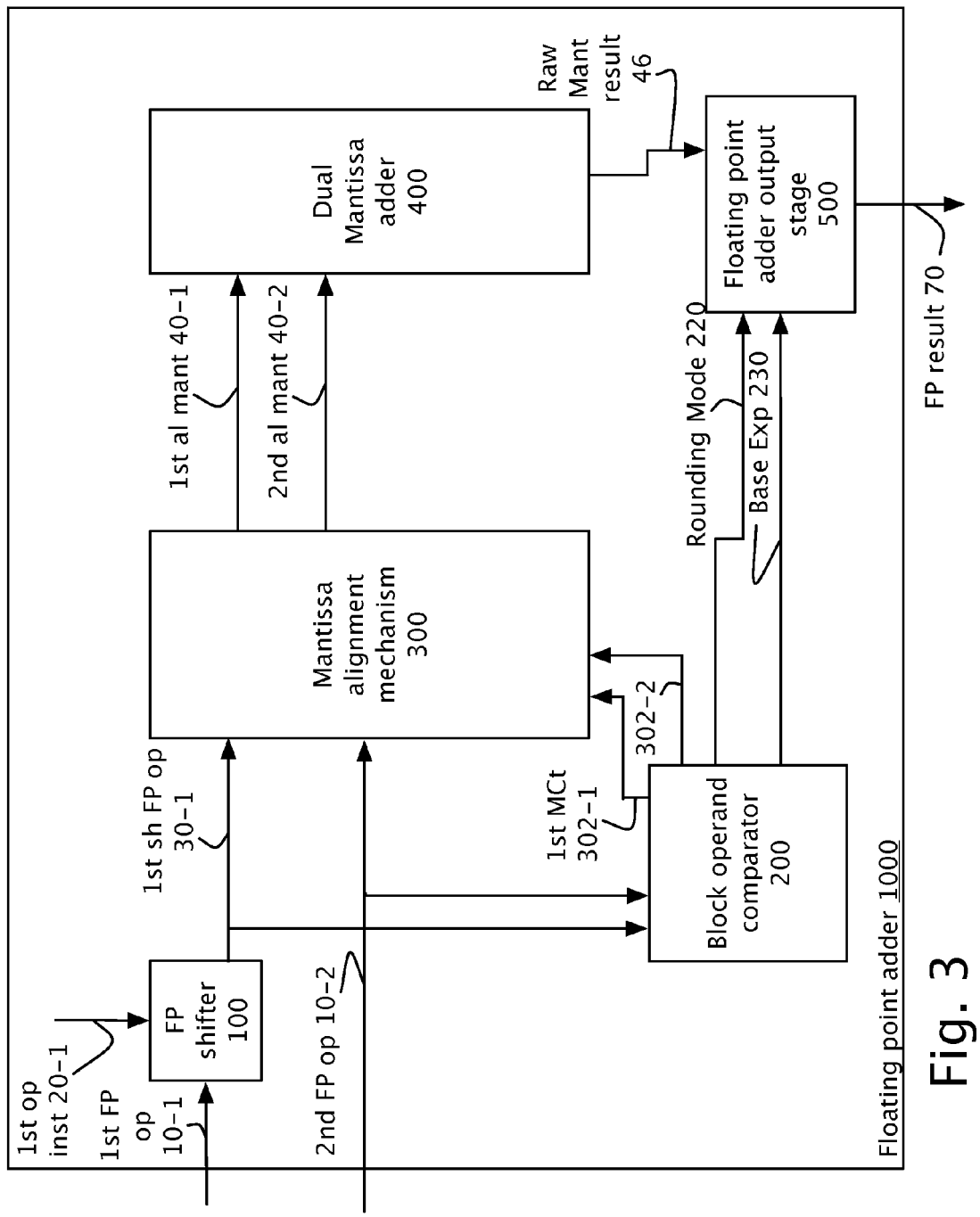
Figure 12:
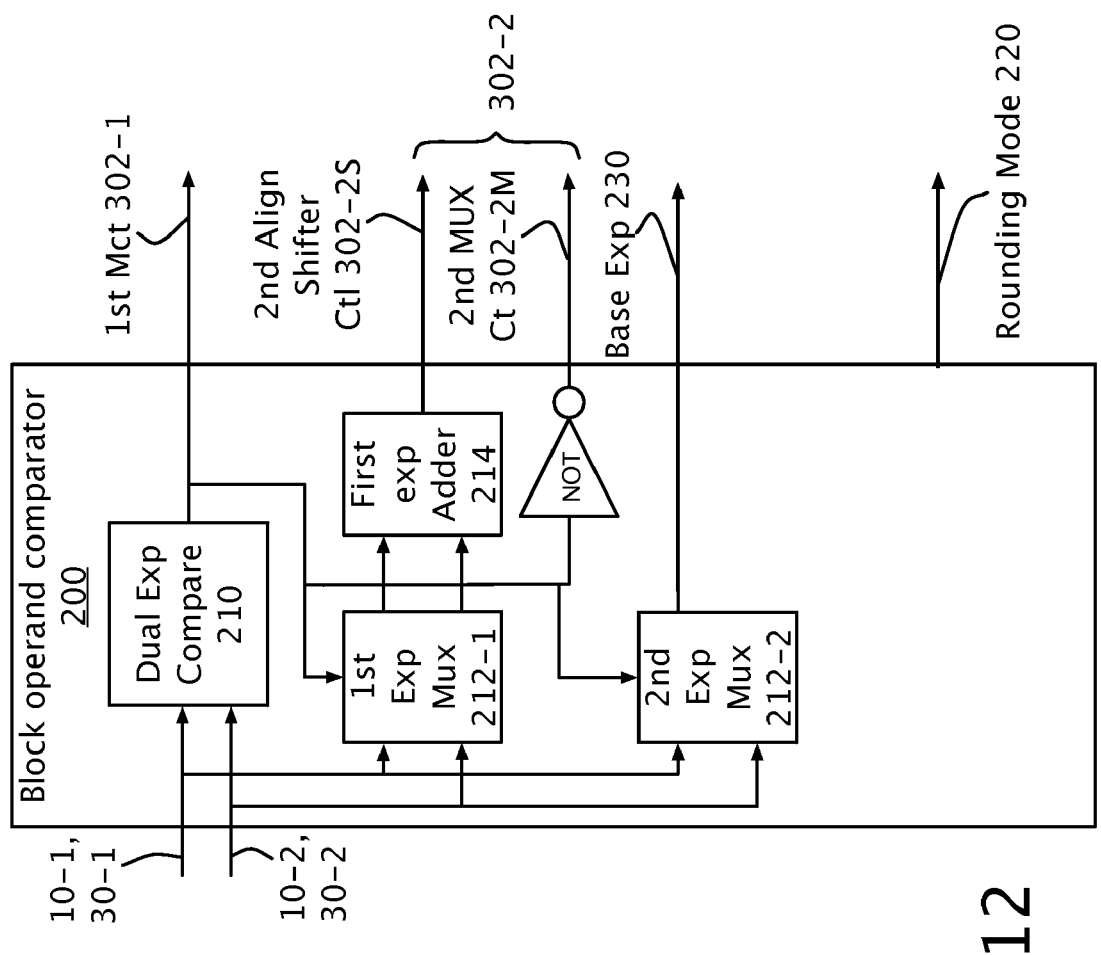
FIG. 12 shows a block operand comparator for use with the mantissa alignment mechanism of FIG. 10.

FIG. 12 shows the block operand comparator 200 for use with the mantissa alignment mechanism 300 of FIG. 10 in an instance of the floating point adder 1000 of FIG. 3 or 4. The corresponding floating point operand for the first floating point operand 10-1 is the first shifted floating point operand 30-1 in both FIGS. 3 and 4 which is provided to a dual exponent comparator 210, a first exponent multiplexer 212-1, and to a second exponent multiplexer 212-2. The corresponding floating point operand for the second floating point operand 10-2 of FIG. 3 is the second floating point operand which is provided to the dual exponent comparator, the first exponent multiplexer, and to the second exponent multiplexer. The corresponding floating point operand for the second floating point operand of FIG. 4 is the second shifted floating point operand 30-2 which is provided to the dual exponent comparator, the first exponent multiplexer, and to the second exponent multiplexer.

The dual exponent comparator 210 generates the first mantissa control 302-1 based upon the provided corresponding floating point operands. The second mantissa multiplexer control 302-2M is preferably the logical inverse of the first mantissa control. The alignment shifter control 302-2S is preferably the difference between the base exponent 230 and the exponent 12 of the other corresponding floating point operand, which is not necessarily smaller than the base exponent, but is not larger than it.

Figure 11B:
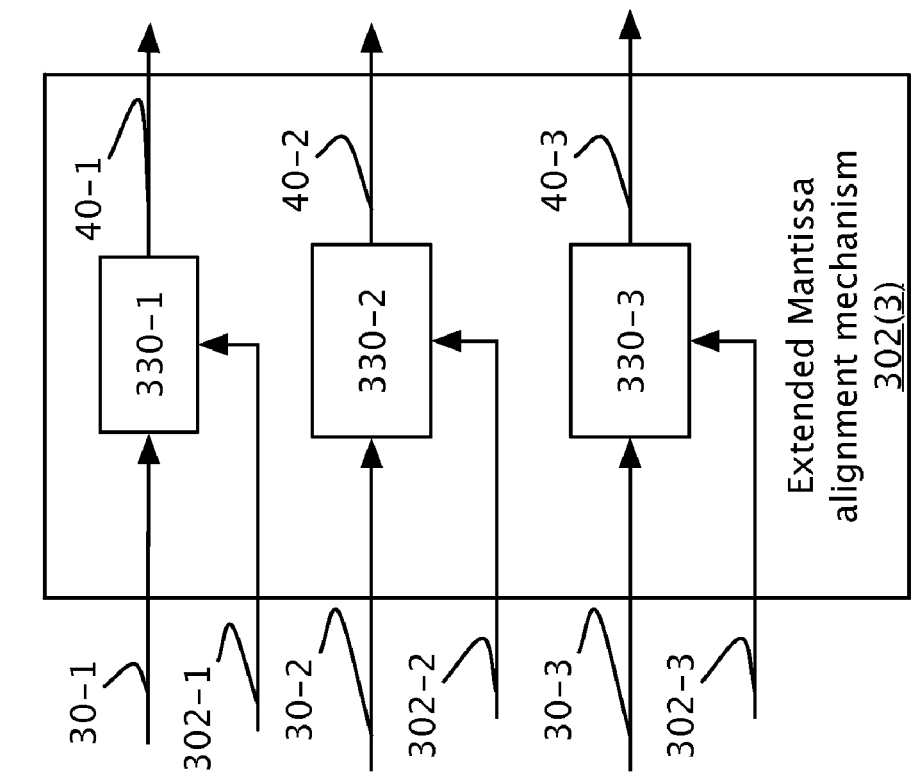
FIG. 11B shows an example of an extended mantissa alignment mechanism for use in the invention's floating point adders shown in FIGS. 5 to 9.
Figure 11A:
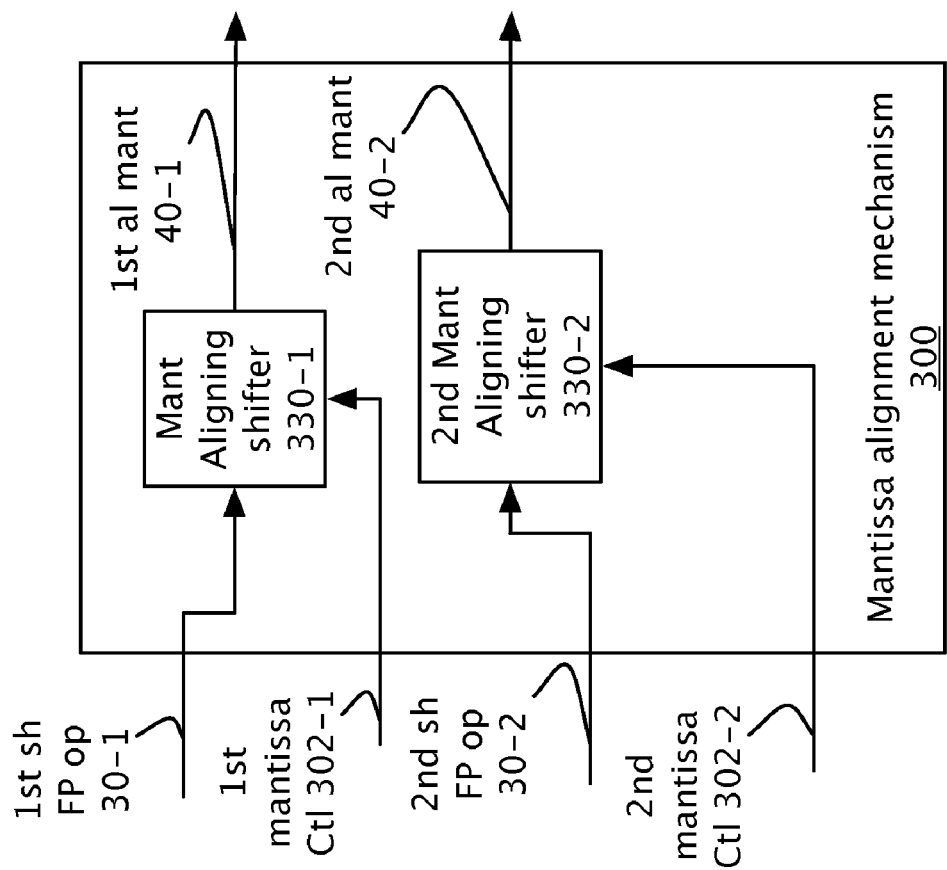

FIG. 11A shows a second embodiment of the mantissa alignment mechanism 300 of the floating point adder 1000 of FIGS. 3 and 4. The corresponding floating point operand of the first floating point operand 10-1 of FIG. 4 is the first shifted floating point operand 30-1 received by a first mantissa aligning shifter 330-1, which is directed by the first mantissa control 302-1 to create the first aligned mantissa 40-1. Similarly, the corresponding floating point operand of the second floating point operand 10-2 of FIG. 4 is the second shifted floating point operand 30-2 received by a second mantissa aligning shifter 330-2, which is directed by the second mantissa control 302-1 to create the first aligned mantissa 40-1.

Figure 13:
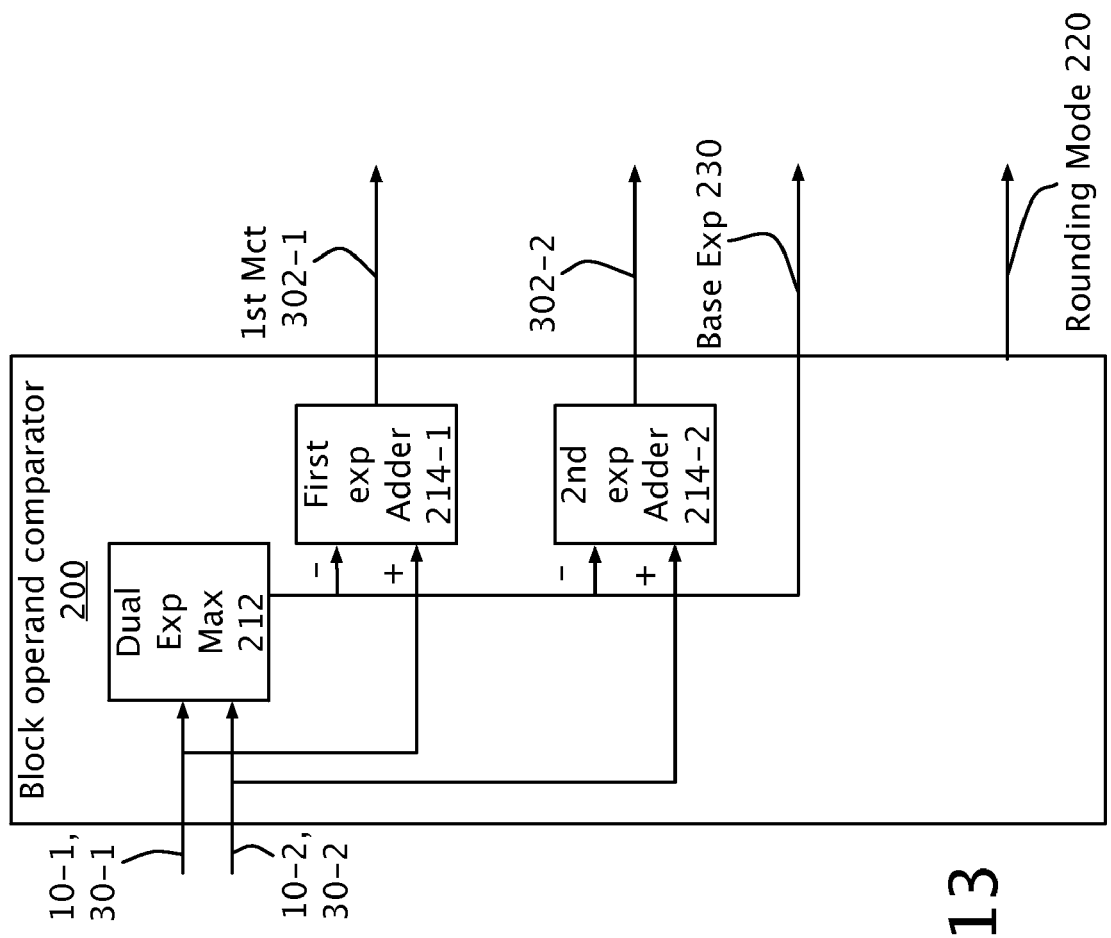
FIG. 13 shows a block operand comparator for use with the mantissa alignment mechanism of FIG. 11A.

FIG. 13 shows the block operand comparator 200 for use with the mantissa alignment mechanism 300 of FIG. 11A in an instance of the floating point adder 1000 of FIG. 3 or 4. The corresponding floating point operand for the first floating point operand 10-1 is the first shifted floating point operand 30-1 in both FIGS. 3 and 4 which is provided to a dual exponent comparator 210 and to a first exponent adder 214-1. The corresponding floating point operand for the second floating point operand 10-2 of FIG. 3 is the second floating point operand which is provided to the dual exponent comparator and to a second exponent adder 214-2. The corresponding floating point operand for the second floating point operand of FIG. 4 is the second shifted floating point operand 30-2 which is provided to the dual exponent comparator, the first exponent multiplexer and to the second exponent adder.

The dual exponent comparator 210 generates the base exponent 230 as the maximum of the exponent of the corresponding floating point operands. The exponent of each of the corresponding floating point operands is subtracted from the based exponent to create their mantissa control. By way of example, the exponent of the corresponding floating point operand of the first floating point operand 10-1 is subtracted to create the first mantissa control 302-1. The exponent of the corresponding floating point operand for the second floating point operand 10-2 is subtracted from the base exponent to create the second mantissa control 302-2.

While both of these approaches to mantissa alignment and operand comparison are equally valid and may be preferred in certain embodiments for the invention's floating point adders receiving N floating point operands, the discussion is focused on the approach taken in FIGS. 10 and 12, which will now be discussed for N greater than two, as shown by example the floating point adders of FIGS. 5 to 9.

Figure 14:
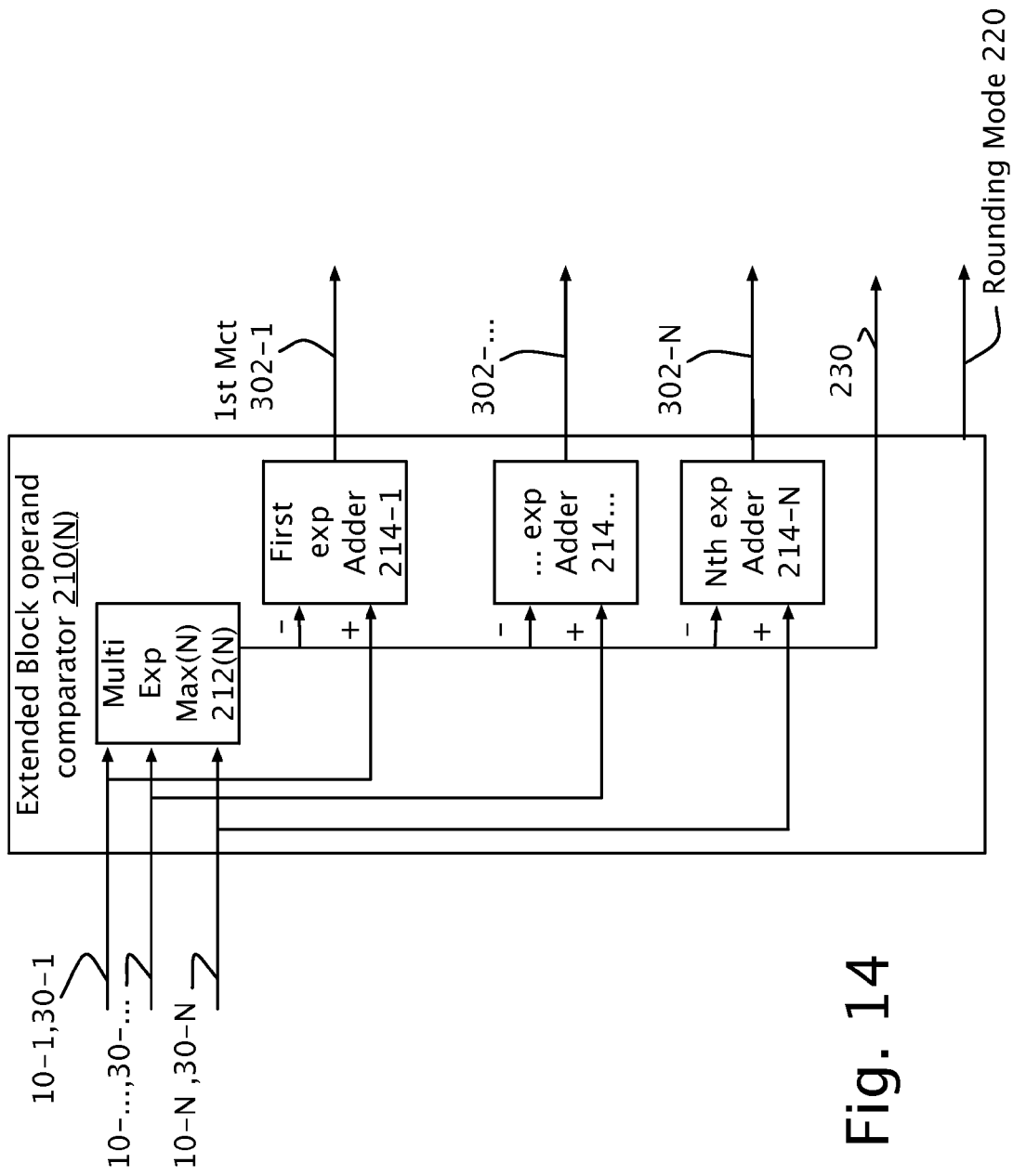

FIG. 14 shows the extended block operand comparator 210(N) used in FIGS. 5 to 9. The corresponding floating point operand, for each of the N floating point operands is provided to the multiple exponent maximum calculator 212(N) which creates the base exponent 230 which is negatively provided to each of the N exponent adders 214-1 to 214-N. Each corresponding floating point operand is provided to one of these exponent adders to create the multiplexer control (302-1 to 302-N) used in the extended mantissa alignment mechanism with the mantissa of the corresponding floating point component. By way of example the corresponding floating point operand for the first floating point operand 10-1 may either be the first floating point operand when the floating point adder 1000(N) does not include a first floating point shifter 100-1, or be the first shifted floating point operand 30-1 when it does.

Figure 15:
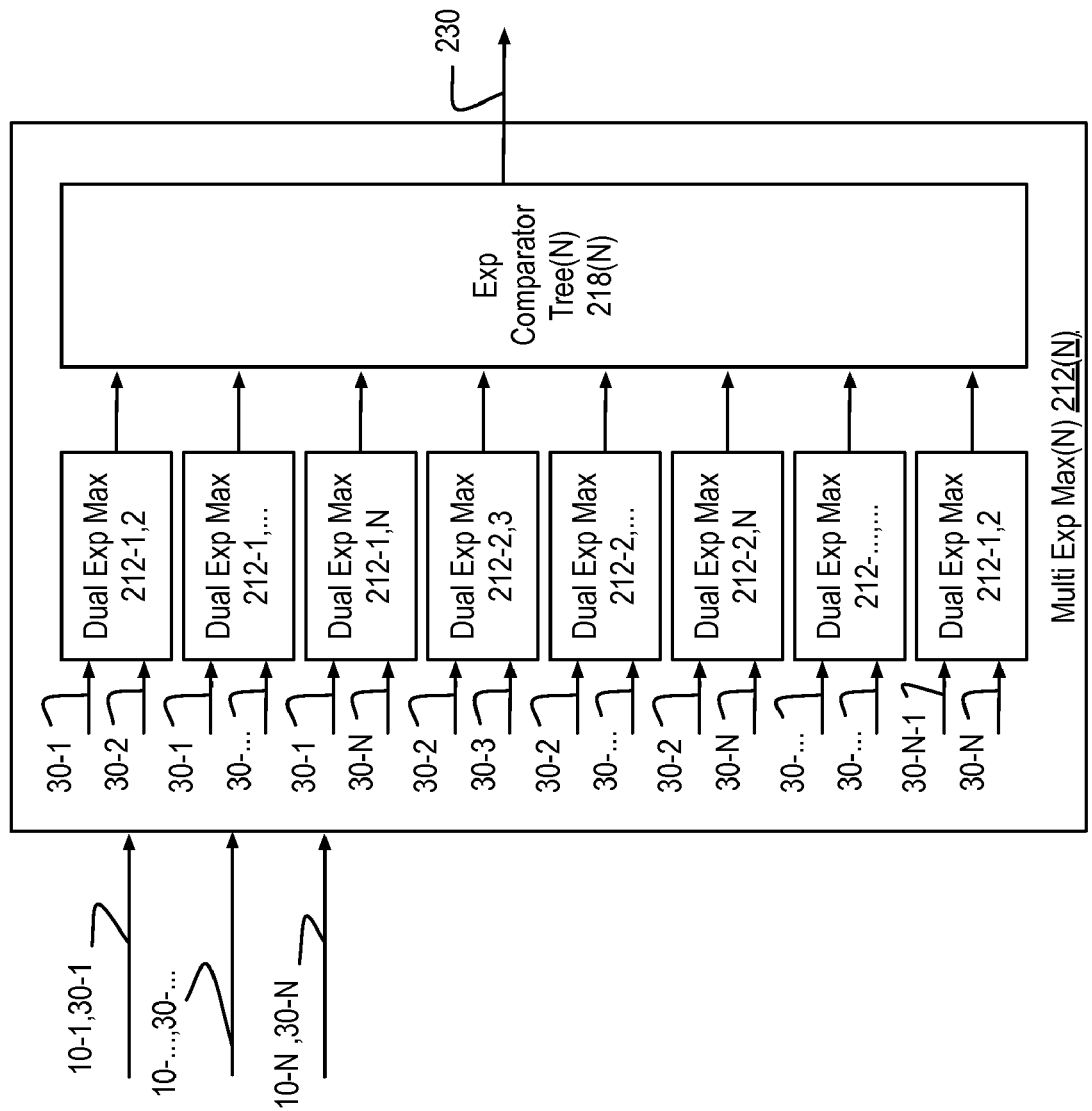
Figures 16A, 16B:
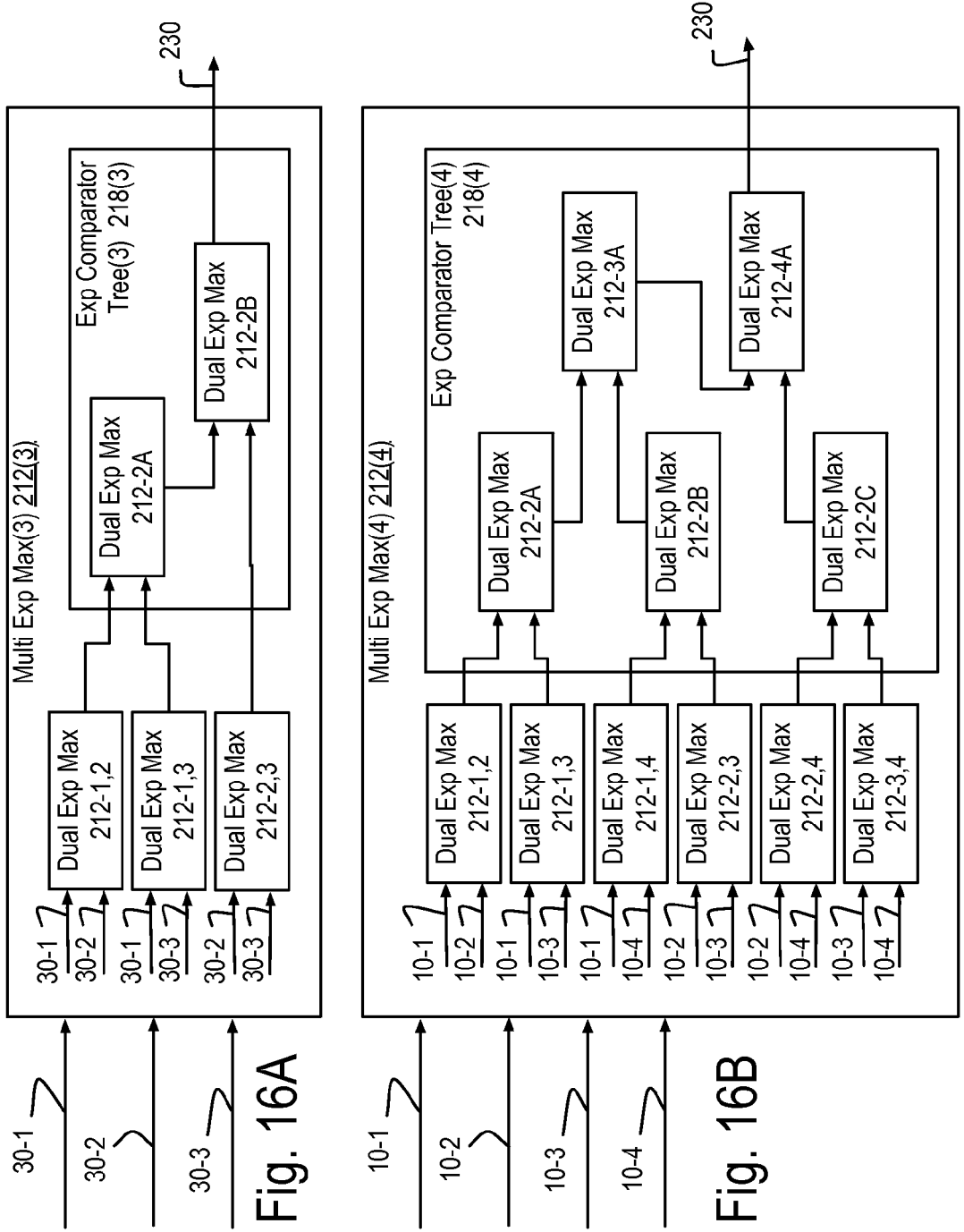

FIGS. 15 to 16B show examples of the multiple exponent maximum calculator 212(N), where in FIG. 15 N is in general greater than 2, in FIG. 16A, N is 3 and in FIG. 16B N is 4. The dual exponent maximum circuits, for example, the instances labeled 212-I,J where I ranges from 1 to N−1 and J ranges from 1 to N determine which of the exponents is maximum, and select that maximum as the output.

Figure 17:
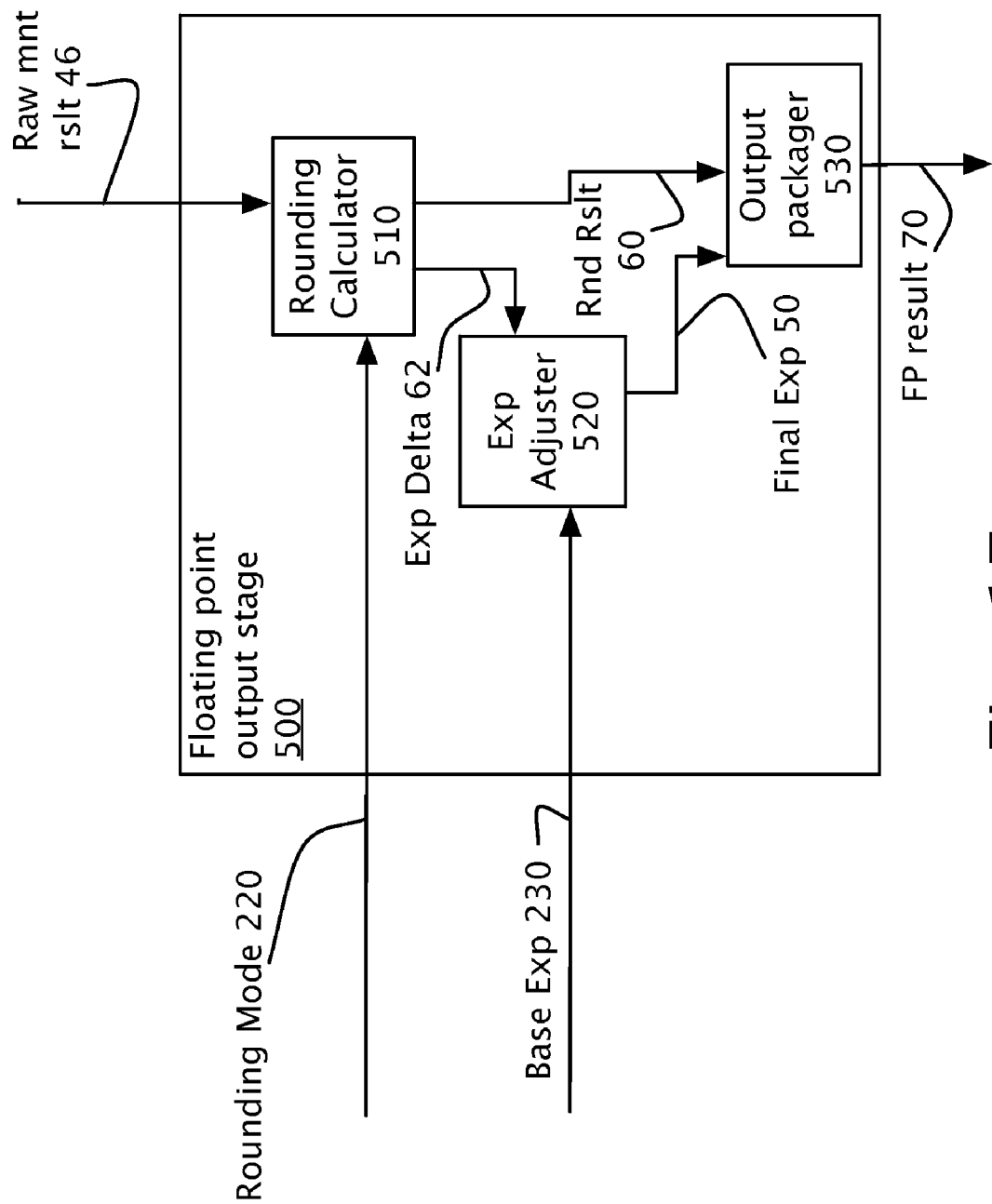
FIG. 17 shows some details of the floating point output stage of FIGS. 3 and 4.

FIGS. 17 and 18 show the floating point output stage 500 used with the dual input floating point adder of FIGS. 3 and 4, and the expanded floating point output stage 502(N). These circuits operate similarly, but different in that the expanded floating point output stage must deal with a larger raw mantissa result 46 than the floating point output stage, because more mantissas are being added.

In certain embodiments of the invention there is an ability to control a rounding mode 220. This is a well understood issue in the community of digital designers who implement floating point adders, and its discussion will be limited to the following. First, not all floating point adders can change their rounding mode. Second, there are certain standard rounding modes, including round to zero, round to negative infinity, round to positive infinity, and round to nearest, which is often preferred with ties going to the even mantissa. Various embodiments of the invention's floating point shifter 100 and floating point adder 1000(N) works with all of these variations as well as the less common preference of ties going to the odd mantissa.

The preceding embodiments provide examples of the invention and are not meant to constrain the scope of the following claims.

What is claimed is:
1. An apparatus, configured to support floating point calculation of a discrete wavelet filter, comprising:
   a floating point adder configured to receive N floating point operands with at least one of said floating point operands being a floating point product,
   wherein said adder creates shifted floating point products and a floating point result based upon said shifted floating point product to at least partly calculate said discrete wavelet filter, wherein each of said floating point operands and said floating point result includes an exponent and a mantissa, wherein N is at least three, comprising:
   an extended block operand comparator receiving a corresponding floating point input for each of said N of said floating point operands to create a mantissa control for each of said corresponding floating point operands, and a base exponent;
   N instances of a floating point shifter with each of said floating point shifters receiving a corresponding one of each of said floating point operands to create said corresponding floating point input, wherein each floating point shifter alters the exponent of said corresponding floating point operand, with said corresponding floating point input as said shifted floating point product in response to said floating point operand being said floating point product;
   an extended mantissa alignment mechanism receiving said corresponding floating point input and said mantissa control to create an aligned mantissa, for each of said N of said floating point operands;
   a mantissa adder receiving said N of said aligned mantissas to create a raw mantissa result; and
   an extended floating point adder output stage receiving said base exponent and said raw mantissa result to create said floating point result to support calculation of said discrete wavelet filter, wherein said floating point result is an optimized floating point target for said discrete wavelet filter.

2. The apparatus of claim 1, further comprising a mechanism comprising:
   means for calculating in said floating point said discrete wavelet filter, further comprising said floating point adder including
   means for floating point shifting said floating point operand to create said corresponding floating point input, for each of said floating point operands;
   means for extended block comparing said corresponding floating point input to create said mantissa control, for each of said N of said floating point operands, and to create a base exponent;
   means for mantissa aligning said corresponding floating point input based upon said mantissa control to create said aligned mantissa, for each of said N of said floating point operands;
   means for mantissa compressing said N of said aligned mantissas to create said first combined mantissa and a second aligned mantissa;
   means for mantissa adding said first combined mantissa and said second combined mantissa to create said raw mantissa result;
   means for rounding said raw mantissa result to create a rounded mantissa result and an exponent delta;
   means for adding said base exponent to said exponent delta to create an exponent result; and means for output packaging said exponent result and said rounded mantissa result to create said floating point result.

3. The apparatus of claim 2, implemented in an instance of at least one member of the implementation group consisting of: a programmable logic device, an Application Specification Integrated Circuit (ASIC), a gate array, a full custom integrated circuit, and a mixed signal integrated circuit;
   wherein said instance uses at least one member of the switching technology group consisting of: a transistor switch, a photonic switch, a molecular switch, a ferroelectric switch, and a quantum effect switch.

4. The apparatus of claim 2, further comprising N instances of said floating point shifter, each comprising:
  means for altering said exponent to create said altered exponent;
  means for forming zero as said corresponding floating point operand when said altered exponent is below said dirty-zero-threshold; and
  means for packing said altered exponent and said mantissa included to create said corresponding floating point operand when said altered exponent is above said dirty-zero-threshold.

5. The apparatus of claim 4, wherein each of said instances of said floating point shifter receives a separate shift operand instruction to direct its creation of said corresponding floating point input.

6. The apparatus of claim 1, wherein each of said instances of floating point shifter comprises
  means for altering said exponent to create said altered exponent;
  means for forming zero as said corresponding floating point operand when said altered exponent is below said dirty-zero-threshold; and
  means for packing said altered exponent and said mantissa included to create said corresponding floating point operand when said altered exponent is above said dirty-zero-threshold.

7. The apparatus of claim 6, wherein each of said instances of said floating point shifter receives a separate shift operand instruction to direct its creation of said corresponding floating point input.

8. A method of
  calculating in floating point a discrete wavelet filter, comprising the step of operating a floating point adder configured to receive N floating point operands with at least one of said floating point operands being a floating point product, wherein said adder comprises N instances of a floating point shifter to create shifted floating point operands based upon said shifted floating point product, to at least partly calculate said discrete wavelet filter, with said N is at least three,
  wherein the step operating said floating point adder comprises performing the steps of:
  floating point shifting each of said floating point operands to create shifted floating point operands, wherein floating point shifting further comprises:
    altering an exponent included in said floating point operand to create an altered exponent;
    forming zero as said shifted floating point operand when said altered exponent is below a dirty-zero-threshold; and
    packing said altered exponent and a mantissa included in said floating point operand to create said shifted floating point operand when said altered exponent is above said dirty-zero-threshold;
  extended block comparing said shifted floating point operands to create said mantissa control, for each of said N of said floating point operands, and to create a base exponent;
  mantissa aligning said corresponding floating point operand based upon said mantissa control to create said aligned mantissa, for each of said N of said floating point operands;
  mantissa adding said N of said aligned mantissas to create said raw mantissa result;
  rounding said raw mantissa result to create a rounded mantissa result and an exponent delta;
  adding said base exponent to said exponent delta to create an exponent result; and
  output packaging said exponent result and said rounded mantissa result to create a floating point result, wherein said floating point result is an optimized floating point target for said discrete wavelet filter.

9. A specification of circuitry stored on a non-transitory machine readable medium implementing a floating point adder configured to receive N floating point operands with at least one of said floating point operands being a floating point product, wherein said adder comprises N instances of a floating point shifter to create shifted floating point operands based upon said shifted floating point product, wherein each floating point shifter receives a corresponding one of each of said floating point operands, to at least partly calculate a discrete wavelet filter, with said N at least three, comprising:
  a first specification for a circuit implementation of said floating point shifter, comprising:
    a second specification (5004) disclosing altering an exponent included in said corresponding floating point operand to create an altered exponent;
    a third specification (5006) disclosing forming zero as a shifted floating point operand when said altered exponent is below a dirty-zero-threshold;
    a fourth specification (5008) disclosing packing said altered exponent and a mantissa to create a shifted floating point operand when said altered exponent is above said dirty-zero-threshold;
  a fifth specification (5104) disclosing extended block comparing a shifted floating point operands to create a mantissa control, for each of said N of said floating point operands, and to create a base exponent;
  a sixth specification (5106) disclosing mantissa aligning said corresponding floating point operand based upon said mantissa control to create an aligned mantissa, for each of said N of said floating point operands;
  a seventh specification (5108) disclosing mantissa adding said N of said aligned mantissas to create a raw mantissa result;
  a eighth specification (5110) disclosing rounding said raw mantissa result to create a rounded mantissa result and an exponent delta;
  an ninth specification (5112) disclosing adding said base exponent to said exponent delta to create an exponent result; and
  a tenth specification (5114) disclosing output packaging said exponent result and said rounded mantissa result to create a floating point result, wherein said floating point result is an optimized floating point target for said discrete wavelet filter.

10. The specification of claim 9, wherein at least one member of the specification group includes at least one expression in at least one member of the specification language group;
  wherein said specification group consists of the members: said first specification, said second specification, said third specification, said fourth specification, said fifth specification, said sixth specification, said eighth specification, said ninth specification, and said tenth specification;
  wherein said specification language group consists of the members: a version of a hardware description language, a version of a netlist specification, and a version of a programming specification for a programmable logic device;

wherein said programmable logic device is a member of the group consisting of: a programmable resource, and a programmable network of at least two of said programmable resources;

wherein said programmable resource includes at least one instance of at least one member of the group consisting of: a programmable arithmetic circuit, a programmable logic array, a programmable memory array, and a programmable register block;

wherein said hardware description language includes the VHLD language, the Verilog language, the SystemC.

11. An arithmetic processor (3000), comprising: at least one of said floating point adders of claim 1 receiving said N floating point operands, where N is at least 3.

12. The arithmetic processor of claim 11, further comprising: at least two instances of said floating point adders, wherein said floating point adders can be configured to perform quadrant offset adds of at least four floating point products, and wherein said floating point adders further comprise:
    means for floating point shifting said floating point operand to create said corresponding floating point input, for each of said floating point operands;
    means for extended block comparing said corresponding floating point input to create said mantissa control, for each of said N of said floating point operands, and to create a base exponent;
    means for mantissa aligning said corresponding floating point input based upon said mantissa control to create said aligned mantissa, for each of said N of said floating point operands;
    means for mantissa compressing said N of said aligned mantissas to create said first combined mantissa and a second aligned mantissa;
    means for mantissa adding said first combined mantissa and said second combined mantissa to create said raw mantissa result;
    means for rounding said raw mantissa result to create a rounded mantissa result and an exponent delta;
    means for adding said base exponent to said exponent delta to create an exponent result; and means for output packaging said exponent result and said rounded mantissa result to create said floating point result.

13. The arithmetic processor of claim 12, wherein at least one of said floating point adders is closely coupled to a local memory.

14. The arithmetic processor of claim 13, further comprising at least eight floating point adders, each of said floating point adders closely coupled to at least one of said local memories.

\* \* \* \* \*